(12) United States Patent
Chuuma et al.

(10) Patent No.: US 7,648,416 B2
(45) Date of Patent: Jan. 19, 2010

(54) INFORMATION EXPRESSING METHOD

(75) Inventors: Jun Chuuma, Hyogo (JP); Hiroyuki Kotani, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 2003 days.

(21) Appl. No.: 10/072,296

(22) Filed: Feb. 6, 2002

(65) Prior Publication Data

US 2002/0138853 A1    Sep. 26, 2002

(30) Foreign Application Priority Data

Feb. 8, 2001  (JP) ............................. 2001-032960
Feb. 6, 2002  (JP) ............................. 2002-030099

(51) Int. Cl.
*G10G 1/04*  (2006.01)

(52) U.S. Cl. ............................. 463/40; 463/35; 463/36; 273/461; 84/600; 84/635; 84/636; 725/38; 725/40; 968/821

(58) Field of Classification Search .................. 84/484, 84/644–645, 651–652, 600, 635–636, 710, 84/730; 345/716, 475, 606; 381/61–63, 381/94.4; 463/1, 35–37, 40, 3, 16, 20; 725/37, 725/133, 135, 141, 153, 38, 40; 968/818, 968/820–821; 273/138.1, 138.2, 139, 141 A, 273/141 R, 142 A, 142 B, 142 C, 142 H, 273/142 HA, 460–461

See application file for complete search history.

(56) References Cited

U.S. PATENT DOCUMENTS

| | | | |
|---|---|---|---|
| 3,818,693 A |  | 6/1974 | Allard |
| 4,090,355 A |  | 5/1978 | Morohoshi |
| 5,146,833 A | * | 9/1992 | Lui ............................. 84/462 |
| 5,350,880 A | * | 9/1994 | Sato ............................. 84/609 |
| 5,410,100 A | * | 4/1995 | Kim ............................. 84/645 |
| 5,862,229 A | * | 1/1999 | Shimizu ....................... 381/17 |
| 6,177,623 B1 | * | 1/2001 | Ooseki ..................... 84/477 R |
| 6,225,547 B1 | * | 5/2001 | Toyama et al. ................. 84/611 |
| 6,227,968 B1 | * | 5/2001 | Suzuki et al. ................... 463/7 |
| 6,294,720 B1 | * | 9/2001 | Aoki ........................... 84/611 |

(Continued)

FOREIGN PATENT DOCUMENTS

EP           1 033 157         9/2000

(Continued)

OTHER PUBLICATIONS

Army Men World War: Land Sea Air, Sep. 20, 2000, 3DO Company, The, see in full.*

(Continued)

*Primary Examiner*—Peter DungBa Vo
*Assistant Examiner*—Arthur O. Hall
(74) *Attorney, Agent, or Firm*—Katten Muchin Rosenman LLP

(57) ABSTRACT

A musical rhythm is expressed by the number of the timing marks (for example, three timing marks when in simple triple time); and a musical tempo is expressed by the distance among the timing marks and a timing ball that moves at a fixed speed among those timing marks. Accordingly, a player may easily grasp the tempo of the music and easily determine the rhythm of the music in a sound game.

11 Claims, 19 Drawing Sheets

U.S. PATENT DOCUMENTS

| | | | |
|---|---|---|---|
| 6,347,998 B1 * | 2/2002 | Yoshitomi et al. | 463/42 |
| 6,379,244 B1 * | 4/2002 | Sagawa et al. | 463/7 |
| 6,464,585 B1 * | 10/2002 | Miyamoto et al. | 463/35 |
| 6,529,191 B1 * | 3/2003 | Ryo | 345/419 |
| 6,538,190 B1 * | 3/2003 | Yamada et al. | 84/636 |
| 6,572,475 B1 * | 6/2003 | Okabe et al. | 463/30 |
| 6,607,446 B1 * | 8/2003 | Shimomura et al. | 463/43 |
| 6,991,542 B2 * | 1/2006 | Asami et al. | 463/35 |
| 7,027,600 B1 * | 4/2006 | Kaji et al. | 381/17 |
| 2001/0007829 A1 * | 7/2001 | Suzuki | 463/30 |

FOREIGN PATENT DOCUMENTS

| | | |
|---|---|---|
| JP | 8305356 | 11/1996 |
| JP | 0 903 169 A2 | 9/1998 |

OTHER PUBLICATIONS

Final Fantasy 9, Nov. 14, 2000, Square Electronic Arts L.L.C., see in full.*

Communication pursuant to Article 94(3) EPC dated Feb. 14, 2008, from the corresponding European Application.

* cited by examiner

INFORMATION EXPRESSING METHOD

This application is related to Japanese Patent Application No. 2001-32960 filed on Feb. 8, 2001, and No. 2002-030099 filed on Feb. 6, 2002, based on which this application claims priority under the Paris Convention and the contents of which are incorporated herein by reference.

BACKGROUND OF THE INVENTION

1. Field of the Invention

The present invention is related to an information expressing method, which is suitable for TV game machines and the like, for example; a recording medium, which is recorded with an information processing program; a program execution apparatus; and an information processing program.

2. Description of the Related Art

In recent years, entertainment apparatus such as TV game machines, for example, have become popularized. The entertainment apparatus execute game application programs acquired via various recording media such as CD-ROMs and DVD-ROMs or various communication media (transmission media) such as communication lines and networks and the like. Accordingly, users may envoy various games.

There are numerous types of TV games, however, among these, what is called a sound game, which is a game allowing a game player (hereafter simply referred to as player) to enjoy simulated performance of musical instruments has gained popularity.

Among the sound games, there is a game that displays upon a game screen predetermined marking objects simultaneous to playing music, and scrolls those marking objects in a fixed direction such as vertical or horizontal directions corresponding to the tempo of the music (quickness of the musical piece progression). With this sound game, the player may enjoy simulated musical performances by operating a predetermined buttons upon a game controller (hereafter simply referred to as controller) to be ON such as to coordinate with the timing of when the marking object being scrolled passes a predetermined point. In addition, the program of this sound game also carries out good/bad judgment of the player's rhythmic sense by measuring the matching conditions of the timing for a marking object to pass a predetermined point and the timing for the player to manipulate a button of the controller to be in an ON state.

However, in the case of the above sound game, since the marking object is simply scrolled in the vertical or horizontal direction, it is a drawback that the player has difficulty in grasping the tempo of the music.

Furthermore, in the case where the tempo of the music has charged (for example, change from slow to fast tempo, or fast to slow tempo), since the speed of scrolling the marking object suddenly varies, it becomes extremely difficult for the player to coordinate with the change in tempo.

Moreover, it is generally difficult to judge the rhythm (for example, in simple triple time or quadruple time and such) of a piece just by listening to the music. Accordingly, in the case of conventional sound games, in order to enjoy the game (play to the rhythm of a piece), the player is required to have a strong sense of rhythm, making it difficult for a player without confidence in rhythmic sense to play the game.

As in the above, the conventional sound games make it difficult for the player to grasp the tempo of the music, and are of high difficulty, requiring a strong sense of rhythm.

SUMMARY OF THE INVENTION

The present invention takes such problems into consideration, and aims to make it easy to grasp the timing of predetermined information and to easily determine the cycle of the information. Namely, the present invention aims to provide an information expressing method; a recording medium, which is recorded with an information processing program; a program execution apparatus; and an information processing program, allowing the player to easily grasp the tempo of the music, easily determine the rhythm of the piece, further enables him/her to carry out a musical performance, for example, as an orchestral conductor.

The present invention expresses by the number of the predetermined objects a structure of repeating periodically changing information; and expresses the progressing speed of the information by the distance among the predetermined objects and a moving object that moves among the predetermined objects.

The structure of repeating periodically changing information may be a structure of repeating periodically, for example, strong and weak sounds, such as the rhythm of the music. The progressing speed of the information may be the progressing speed of, for example, a musical piece such as the tempo of the music. Namely, the present invention expresses the rhythm of the music by, for example, the number of the predetermined objects, and expresses the tempo of the music by the distance among the predetermined objects and the moving of the moving object.

Artisan will fully understand the above and further objects and features of the present invention by reading preferred embodiments of the invention described herein in connection with the accompanying drawings, including features recited in the appended claims, as well as explicit and implicit effects and advantages of the invention, including those to be apparent through implementation of the invention.

BRIEF DESCRIPTION OF DRAWINGS

FIG. 16 is a flowchart showing an example of processing OK/NG judgment of the timing on the beat, OK/NG Judgment of pushing of buttons and the like according to mark color and symbol, pressure-sensed value measurement and OK/NG Judgment and the like.

DETAILED DESCRIPTION OF THE PREFERRED EMBODIMENTS

Figure 1:
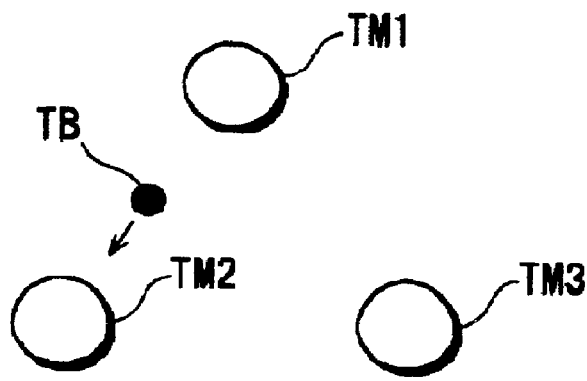
FIG. 1 is a schematic diagram for the description of the arrangement of timing marks in the case of simple triple time and a timing ball moving between each timing mark.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Brief Description of TV Game of the Embodiment

An embodiment of a TV game that the present invention is applied to is a sound game allowing a player to simulatively conduct a musical performance as, for example, an orchestral conductor, and carry out the management of musical pieces and produce music; in particular, it is one allowing the player to play the game while visually confirming the tempo and rhythm of the music.

The game program of this sound game displays upon a television monitor screen (TV game screen) timing marks TM and timing ball TB as described below with FIG. 1 through FIG. 12. Then, the game program expresses each element that is needed when simulatively conducting or producing music such as tempo, rhythm, beat, volume, part designations, and sostenuto and the like based on the distance among timing marks TM (length between marks, distance of empty space), number of the marks, the display color of each mark, symbol displayed upon the marks, the moving of timing ball TM and the like. In this manner, the game program visually informs the player of each element required when simulatively conducting or producing music based on the distance among timing marks TM, number of marks, the display color of each mark, the symbol displayed upon the marks, the moving of timing ball TM and the like.

Moreover, the game program detects that a button upon a controller is operated to be ON by the player so as to adjust the length of sostenuto. In addition, the game program detects the pushing pressure on the button so as to adjust the volume according to that pressure-sensed value. Furthermore, the game program detects the operation of direction keys upon the controller by the player. Accordingly, the game program recognizes the command input for simulated conducting and producing by the player.

It is noted that details of the TV game system of this embodiment, the controller, the buttons upon that controller, the means for detecting pushing pressure when operating those buttons to be ON, and direction keys upon the controller and the like will be described later.

Details of Timing Marks and Timing Ball and expression Examples of Each Element

FIG. 1 through FIG. 12 show examples of timing mark TM arrangement and specific examples of timing ball TB moving among timing marks TM.

The game program displays timing marks TM in predetermined positions (for example, easily seen position such as center screen) upon the TV game screen. Furthermore, the game program displays timing ball TB so as to move among timing marks TM at a fixed speed. This game program visually informs the player in an easy to understand fashion of the following six types of elements (elements necessary for simulated conducting and producing of music) such as tempo, rhythm, beat, volume, part designations and sostenuto by showing such as the arrangement of timing marks TM, number of the marks, distance among marks, the mark color, the symbol displayed upon the marks, and by the moving of a timing ball TB.

Expression of Tempo

Figure 2:
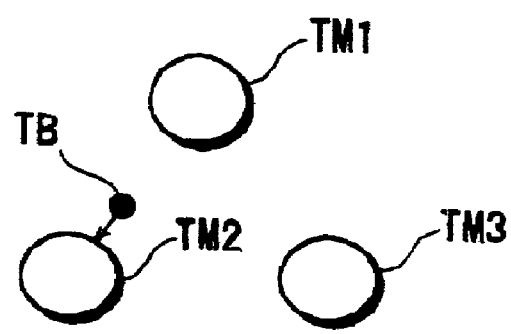
FIG. 2 is a schematic diagram for the description of expressing tempo by the distance among the timing marks.

This sound game expresses the tempo of pieces (quickness of musical piece progression) by the distance among timing marks TM. Namely, this sound game expresses the tempo of a piece by the distance among timing marks TM (length among marks) under the condition of moving timing ball TB at a fixed speed between each timing mark TM. More specifically, the game program coordinates the ideal tempo of the musical piece with the intervals of time between each timing mark TM which are decided by timing ball TB moving at a fixed speed and overlapping with each timing mark TM in turn. Namely, this game program, for example as shown in FIG. 1, informs the player that the tempo of the musical piece is slow by lengthening the distance among timing marks TM so as to lengthen the intervals of time required for moving the timing ball TB between each timing mark TM. Furthermore, the game program, as shown in FIG. 2, informs the player that the tempo of the musical piece is fast by shortening the distance among timing marks TM so as to shorten the intervals of time required for moving the timing ball TB among those timing marks TM. In this manner, the game program, by the length of the distance among timing marks TM, visually informs the player in an easy to understand fashion the tempo of the musical piece.

Furthermore, the game program, according to need, changes the distance between each timing mark TM even mid-musical piece. Namely, when the tempo is altered (tempo change) mid-musical piece, the game program changes the distance between each timing mark TM according to that alteration. In this manner, by changing the distance among timing marks TM, the game program visually informs the player in an easy to understand fashion whether or not there has been a tempo change and what the tempo is thereafter. Moreover, the displaying position of each timing mark TM is shifted at the point when timing ball TB passes, for example, timing mark TM that corresponds to one measure before the timing where tempo change of the music is actually carried out, and changes the distance between each of those timing marks TM to the distance corresponding to the tempo thereafter. In this manner, by the move in displaying position of each timing mark TM, the game program visually informs the player in an easy to understand fashion that there is a tempo change mid-piece. Furthermore, by changing the distance between each timing mark TM, the game program visually informs the player in advance (one measure before tempo change is actually carried out) that tempo change will occur and the tempo thereafter.

It is noted that when tempo change occurs, the game program alters the motion of characters and background images upon the TV game screen accordingly. For example, when the tempo is fixed, the background and characters move in accordance with that tempo; however, when that tempo changes, the game program alters movement of the characters and actual background and images.

Expression of Rhythm

This sound game expresses the rhythm of musical pieces (structure of music wherein the strong/weak sounds are periodically repeated) by the number of timing marks TM. In other words, the game program, for example as in FIG. 1 and FIG. 2, by setting the number of timing marks to be 3 marks, informs the player that it is a piece in simple triple time and as in FIG. 3, by setting the number of marks to be 4 marks, informs the player that it is a piece in quadruple time. It is noted that FIG. 1 and FIG. 2 are Just an example, and by setting the number of marks to be 5 marks, the game program visually informs the player that it is a piece in quintuple time. In this manner, the game program visually informs the player in an easy to understand fashion the rhythm of the musical piece by the number of timing marks TM.

Furthermore, the game program essentially corresponds one measure of a musical piece with the cycle, wherein timing ball TB shifts in turn between each of three or four timing marks TM coming full circle. For example, in the case of triple time as shown in FIG. 1 and FIG. 2, the game program corresponds one measure of a musical piece in triple time with one cycle of timing ball TB moving in the order of timing mark TM1→TM2→TM3→TM1. Furthermore, in the case of quadruple time shown in FIG. 3, for example, the game program corresponds one measure of a musical piece in quadruple time with one cycle of timing ball TB moving in the order of timing mark TM1→TM2→TM3→TM4→TM1. In this manner, the game program, by corresponding one measure of the musical piece with one cycle that timing ball TB shifts, visually informs the player in an easy to understand fashion one measure of a musical piece.

Moreover, according to need, the game program changes the number of the timing marks TM, even mid-musical piece. Namely, in the case where the rhythm is altered (change in rhythm) mid-musical piece, the game program changes the number of the timing marks TM according to that alteration. In this manner, the game program visually informs the player the occurrence of change in rhythm and the rhythm thereafter. Furthermore, the game program changes the number of timing marks TM one measure before the timing of altering the rhythm to the number of marks corresponding to the rhythm thereafter. In this manner, by changing he number of timing marks TM, the game program visually informs the player in an easy to understand fashion that the rhythm will be altered mid-piece; moreover, informs the player that variable rhythm will occur one measure before the rhythm is actually altered.

Expression of Timing on the Beat

Here, the timing on the beat of the musical piece will be referred to as the beat. The game program depicts a symbol corresponding to a predetermined button of the controller upon a desired timing mark TM. In this manner, by depicting upon the desired timing mark TM a symbol corresponding to the predetermined button, the game program visually informs the player of the manipulation to be carried out at the timing on the beat.

Figure 4:
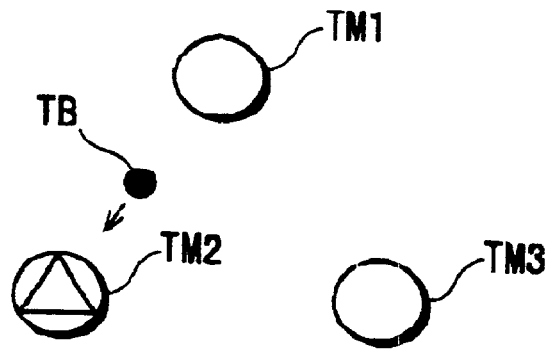
FIG. 4 is a schematic diagram for the description of the beat.

More specifically, as shown in FIG. 4, the game program depicts upon the desired timing mark TM2 a symbol corresponding to the predetermined button (for example, "Δ" button described later) of the controller, requesting the player to perform pushing manipulation of the "Δ" button in accordance with overlapping of timing ball TB and timing mark TM2. Then, according to that request, when the pushing manipulation of the "Δ" button is performed by the player, the game program proceeds with the musical place one beat by hitting on the beat, thus raising the game points.

Figure 5:
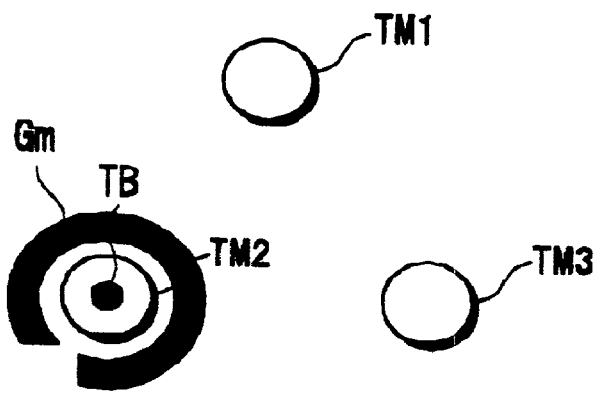
FIG. 5 is a schematic diagram for the description of a depicted circle mark in the case of succeeding in the timing on the beat.

Here, as shown in FIG. 5, when the pushing manipulation of the "Δ" button is carried out by the player and the beat is hit precisely in accordance with overlapping of timing ball TB and the desired timing mark TM2, the game program depicts upon that timing mark TM2 circle mark Gm, which indicates that the timing of the pushing manipulation of the "Δ" button by the player is accurate. On the other hand, as shown in FIG. 6 and FIG. 7, in the case where the pushing manipulation of the "Δ" button is carried out by the player and the beat is not hit Precisely when timing ball TB and the desired timing mark TM2 do not overlap, the game program depicts upon that timing mark TM2 X mark Bm, which indicates that the timing of the pushing manipulation of the "Δ" button by the player is not accurate.

Figure 6:
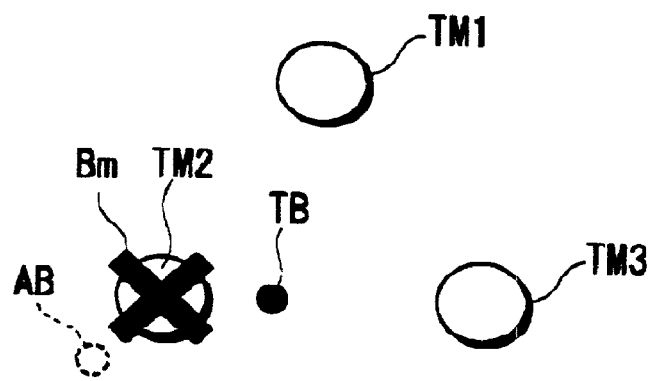
FIG. 6 is a schematic diagram for the description of a depicted X mark in the case of failing in the timing on the beat and a depicted afterimage in the case where the timing on the beat is late.
Figure 7:
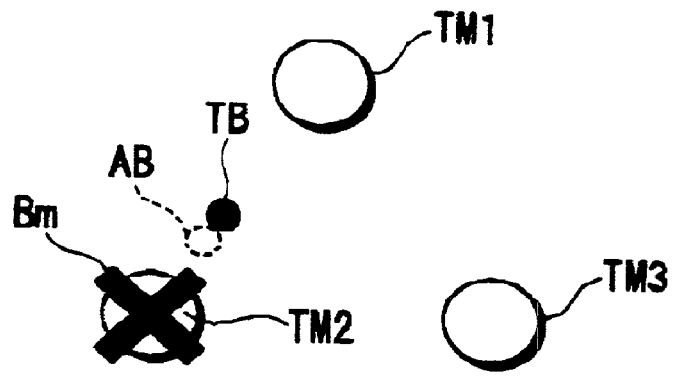
FIG. 7 is a schematic diagram for the description of a depicted X mark in the case of failing to hit the beat and a depicted afterimage in the case where the timing on the beat is early.

Furthermore, in the case where the "Δ" button is pressed by the player after timing ball TB passes the desired timing mark TM2, in other words, when the timing of pushing the "Δ" button is late, the game program, as shown in FIG. 6, depicts afterimage AB of timing ball TB, which passed over timing mark TM2. On the contrary, in the case where the "Δ" button is pressed by the player before timing ball TB reaches the desired timing mark TM2, in other words, when the timing of pushing the "Δ" button is early, the game program, as shown in FIG. 7, depicts afterimage AB of timing ball TB in a position before it reaches timing mark TM2. It is noted that afterimage AB of when the timing of button pushing is late may be depicted in a position before it reaches timing mark TM2; and afterimage AB of when the timing of button pushing is early may be depicted in a position it passed over timing mark TM2.

As in the above, the game program informs the player in an easy to understand fashion whether or not the beat is precisely hit, and in the case where the beat is not precisely hit, whether the timing on that beat is too early or too late.

Expression of Volume

The TV game system is made capable of detecting the pushing pressure on the button upon the controller. Furthermore, the game program is capable of setting the magnitude of volume of the music (strong/weak musical performance) according to the pushing pressure of that button.

Furthermore, this sound game expresses the magnitude of volume (strong/weak performance) required for when the player simulatively conducts or produces by using the display color, which is a parameter when displaying upon the monitor screen timing marks TM. More specifically, by setting the display color of timing mark TM to be "red", the game program informs the player that he/she is prompted for an instruction for performing with high volume (perform "strong"); by setting the display color of timing mark TM to be "green", informs the player that he/she is prompted for an instruction for performing with moderate volume (perform "medium"); and by setting the display color of timing mark TM to be "BLUE", informs the player that he/she is prompted for an instruction for performing with low volume (perform "weak").

Figure 8:
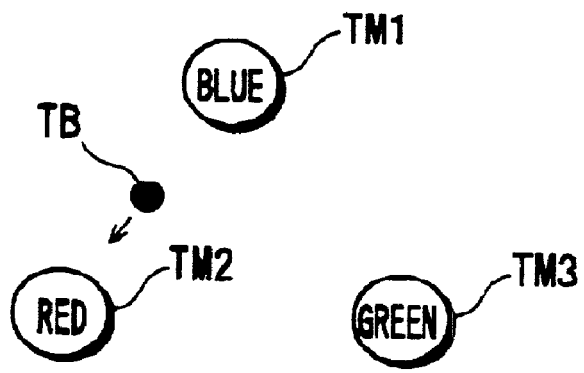
FIG. 8 is a schematic diagram showing the condition of volume expressed by color of the timing marks.

For example, in the case where the player is prompted to adjust the pushing pressure on the button upon the controller such that low volume (perform "weak")→high volume (perform "strong")→moderate volume (perform "medium") →low volume (perform "weak"), the game program, as shown in FIG. 8, sets the display color of timing mark TM1 to be "blue"; sets the display color of timing mark TM2 to be "red"; and sets the display color of timing mark TM3 to be "green"; moreover, moves timing ball TB in the order of timing mark TM1→TM2→TM3→TM1.

In this manner, by the display color of each timing mark TM, the game program informs the player of the magnitude of volume (strong/weak performance) when performing music.

Expression of Part Designations

By depicting upon a desired timing mark TM an arrow symbol corresponding to a desired direction key of the controller, the game program visually informs the player that he/she is prompted for a designation of a part, performer, instrument and the like of a virtual orchestra or band; and an instruction for carrying out the performance of that part, performer, instrument and the like.

Figure 9:
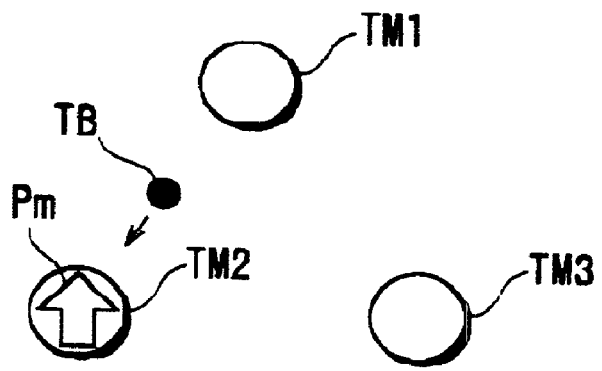
FIG. 9 is a schematic diagram showing the condition of a part designation expressed by a part designating arrow icon upon a timing mark.

More specifically, as shown in FIG. 9, by depicting upon the desired timing mark TM2 part designating arrow icon Pm for designating a desired part, performer or instrument, and by making a relationship between part designating arrow icon Pm and a desired timing mark TM2, the game program requests that the player should perform the pushing manipulation of a direction key at the same time that timing ball TB is overlapped with timing mark TM2, in which part designating arrow icon Pm is depicted. The game program, according to that request, has carried out the performance of the desired part, performer, instrument and the like when the pushing manipulation of the direction key is carried out by the player. On the other hand, in the case where the pushing manipulation of the direction key, is not carried out at the same time that timing mark TM2 is overlapped with timing ball TB, and in he case where the direction key that differs from the direction designated by part designating arrow icon Pm is pushed, the game program does not carry out the performance of the parts, performer, and instrument.

It is noted that this sound game is a game assuming the condition where the part, performer and instrument are arranged in front of the conductor or on both sides thereof as in an orchestra. As a result, the game program displays part designating arrow icon Pm as a symbol that designates a direction from three directions corresponding to the three direction keys of "up", "left" and "right" described later upon the Controller.

Expression of Sostenuto

When the button upon the controller is continuously pushed, the game program stops the progression of music by prolonging the sound or silent state when that button is in an ON state. Then, by depicting the predetermined symbol upon the desired timing mark TM, the game program visually informs the player that he/she is prompted for an instruction regarding the act of intentionally prolonging the length of sound at the time of a musical performance.

Figure 10:
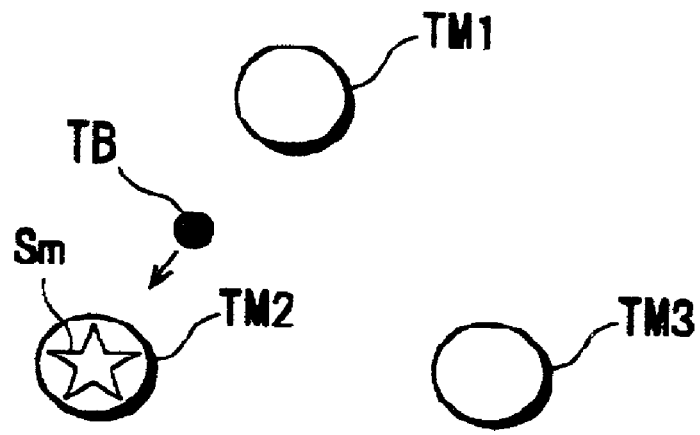
FIG. 10 is a schematic diagram showing the condition of sostenuto expressed by a star mark upon a timing mark.

More specifically, the game program depicts upon the desired timing mark TM2 star mark icon Sm shown in FIG. 10 as a symbol for prompting an instruction for prolonging the length of sound or silent state. Then, when the button upon the controller is continuously pushed by the player for a predetermined set duration in accordance with overlapping of timing ball TB and timing mark TM2, which has depicted star mark Sm, the game program halts the progression of music by prolonging the sound or silent state at that time.

Furthermore, the game program sets the continuous pushing duration of the button for stopping the progression of music to the duration corresponding to the time it takes timing ball TB to move to the next timing mark TM. Furthermore, with the game program, the player's ON re-manipulation of the same button on the controller satisfies the cancellation conditions (resuming conditions for progression of music) for halting progression of the music. It is noted that the reason for the cancellation conditions of the progressing/suspending status of the music as described above is satisfied with the player's ON re-manipulation of the same button upon the controller is because, for example, if release of the continuously pressed button is set as the cancellation condition for the suspending status, a commanding manipulation, which is necessary for the player to enter the next stage so as to give an instruction for the next tempo, is difficult for the player. Moreover, when progression of the music has been halted, the game program orbits timing ball TB or the afterimage thereof, for example, above the periphery of timing mark TM. By displaying such image, the game program visually informs the player that progression of the music has been halted.

In this manner, the same program visually informs the player that he/she is prompted for an instruction for intentionally prolonging the length of sound or silent state By continuously pressing the button upon the controller so as to halt progression of the music by prolonging the sound or silent state while hat button is in an ON state, the player carries out what is called a performance that "holds" notes or a performance that lengthens what is called "a rest".

As described above, by timing marks TM and timing ball TB, this sound game can inform the player each element, such as tempo, rhythm, beat, volume, part designations, sostenuto and the like, that are necessary for simulatively conducting music or carrying out a musical production and allowing the player to carry out simulated conducting and producing of music.

Furthermore, this sound game is prepared with various other modes as well as the normal performance mode as described above. In normal performance mode, the game program prompts the player for an instruction for a strong/weak performance by the display color of timing marks TM; prompts the player for a designation of a part by part designating arrow icon Pm depicted upon timing mark TM; and prompts the player for an instruction for sostenuto by star mark Sm. In other modes, the game program, for example, makes the player carry out estimation according to musical content and prompts the player for an instruction for a strong/weak performance; a designation for the to-be-performed part; and an instruction for the degree of sostenuto at the player's volition. In the mode where the player personally carries out an instruction for a strong/weak performance, a designation of to-be-performed part, or an instruction for the degree of sostenuto, the game program sets the display color for each of all timing marks TM to be "yellow", and does not display part designating arrow icon Pm or star mark Sm. Namely, when the display color for each of all timing marks TM is made to be "yellow", the player must personally carry out an instruction for a strong/weak performance, a designation of a part, and an instruction for sostenuto according to musical content. When each of those instructions matches the musical content, the game program raises the game points. It is noted that the game program sets the mode for the player to personally carry out various instructions, for example, in the mode of continuously performing a plurality of musical pieces (medley mode). Furthermore, in normal performance mode, the game program, for example, displays upon timing marks TM the marks of buttons such as "Δ", "□", "×", and "602", requests the player to push those buttons and shifts from the normal performance mode into the medley mode when those buttons are pushed.

Expression of Game Completion

Figure 11:
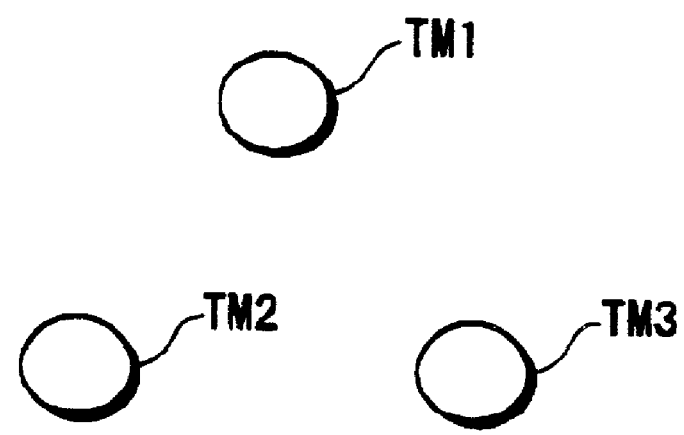
FIG. 11 is a schematic diagram Showing a displaying example of right/wrong judgment results for every measure of game playing.

The game program judges whether or not the player has fulfilled the request concerning the tempo, rhythm, beat, volume, part designations, sostenuto and the like while timing ball TB moves in turn between each of the timing marks come full circle (for every measure). In the case where the game program judges that those requests have been fulfilled, for example as shown in FIG. 11, the game program carries out the display of such characters as "Good!" or "Bravo!" upon a predetermined timing mark TM (for example, TM1), as well as carrying out sound output such as "Good" or "Bravo". Accordingly, the player understands that a game one measure long has successfully been completed. On the contrary, in the case where the player has not fulfilled the requests while timing ball TB makes full circle of each of the timing marks, the game program, for example, displays upon timing mark TM1 the characters "Bad!" or a skull mark or the like, as well as carrying out sound output of "Bad" and the like. Accordingly, the player understands that a game one measure long has not seen completed.

Figure 12:
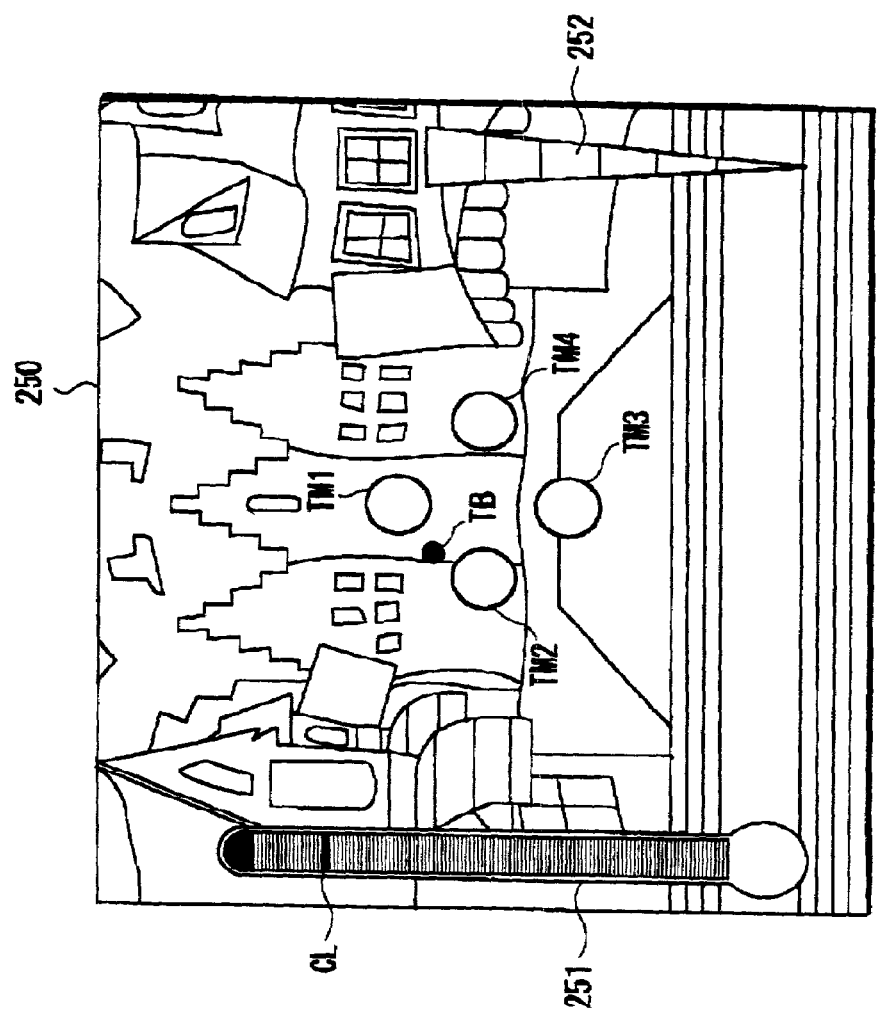
FIG. 12 is a schematic diagram showing an example of a TV game display for the sound game of this embodiment.

The game program, as shown in FIG. 12, displays upon TV game screen 250 timing marks TM (TM1 to TM4 in the example of FIG. 12), timing ball TB and background image, as well as tension meter 251 and pressure-sensing meter 252.

Tension meter 251 comprises color-coded meter levels and game completion standard line CL. The game program raises and lowers the meter level according to the increasing and decreasing of game points. Then, the game program informs the player of the degree of completion of the game by the meter level value of tension meter 251 and color thereof. It is noted that the game program proceeds with the game to the next stage (scene) when the meter level according to the game points exceeds standard line CL.

Pressure-sensing meter 252 comprises color-coded meter levels. The game program raises and lowers the meter level according to the pushing pressure (pressure-sensed value) on buttons when expressing volume. Then, the game program informs the player of the pushing pressure intensity on the buttons by the meter level value of pressure-sensing meter 252 and color thereof. It is noted that the color of the meter level value of pressure-sensing meter 252 corresponds to the color-coding of timing marks TM.

The game program also alters the background images (design and color and the like) in accordance with the rise and fall of the meter level (increase and decrease of game points) of tension meter 251.

Schematic Structure of Game Application Program

Next, the structure of a game program for providing the above-mentioned sound game of this embodiment will be described.

Figure 13:
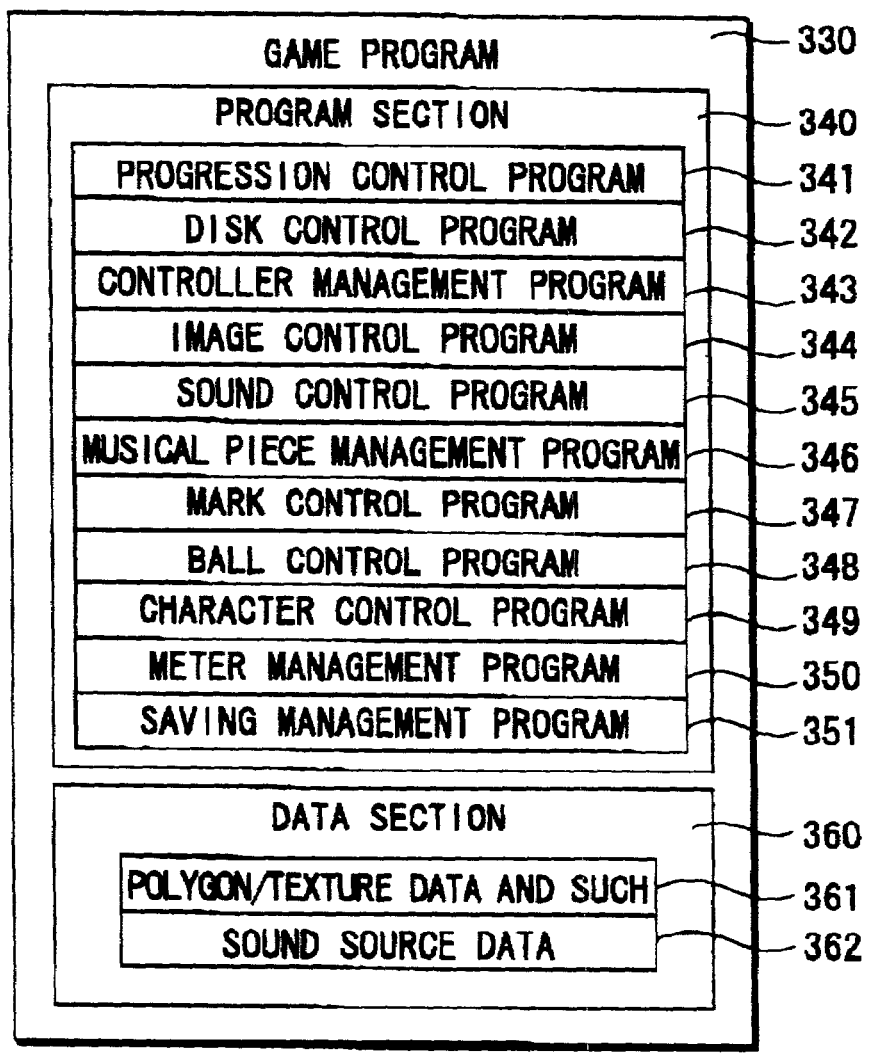
FIG. 13 is a configuration of data for the sound game application program of this embodiment.

The game program has a data structure as shown in FIG. 13, for example, whereby it may be recorded on recording media such as semiconductor memory and optical disks, for example, DVD-ROMs and CD-ROMs, and may be downloaded via transmission media such as communication lines. It is noted that this data structure shown in FIG. 13, as described above, is one that conceptually represents only the main sections of a program section and data section included in this game program allowing the player to carry our simulated conducting or producing of music, and does not represent an actual program structure.

As shown in FIG. 13, roughly classified, game program 330 has program section 340 for a main CPU and the like of a TV game machine described later to execute a sound game, and data section 360 including various data, which is to be utilized when executing the sound game.

Data section 360 has at least polygon/texture data and such 361 and sound source data 362 as various data that are utilized when executing the sound game.

Polygon/texture data and such 361 is data for generation of polygon or texture when generating game images that include characters such as the main character or performer or the like, and background images and the like within the game. Sound source data 362 is waveform data, which is utilized in generating sound game sounds, music of musical pieces, sound effects and the like by a sound processing unit of a TV game machine described later.

Program section 340 has at least progression control program 341, disk control program 342, controller management program 343, image control program 344, sound control program 345, musical piece management program 346, timing mark control program 347, ball control program 348, character control program 349, meter management program 350 and saving management program 351 as programs for executing the sound game.

Progression control program 341 controls progression of the sound game. Disk control program 342 controls reading of data and the like from the optical disks and HDDs according to the beginning or progression of the sound game. Controller management program 343 manages the input signals in response to the player's pushing manipulation of buttons upon a game controller, the operating mode of the controller, vibration generation described later and the like. Image control program 344 generates game images and displays the game images upon a television monitor screen. Sound control program 345 generates and outputs sound and music within the sound game. Musical piece management program 346 manages each of the elements such as performing order of musical pieces performed by the sound game; the start, progress and halt of musical pieces; tempo; rhythm; beat; volume; part designations; sostenuto and the like. Timing mark control program 347 carries our the control of arranged position, number of marks, color, symbol and the like of timing marks TM. Ball control program 348 controls the movement of timing ball TB. Character control program 349 controls the movements and actions of characters appearing within the sound game. Meter management program 350 manages the meter levels of tension meter 251 and pressure-sensing meter 252, which are displayed upon the monitor screen. Saving management program 351 manages saved data, such as by storing the game points generated an the sound game and mid-game data and the like as the saved data on a memory card described later, and reading and the like the saved data that is stored on the memory card Flow of Game Application during Execution In the following, processing flow of the game program shown in FIG. 13 described above and the flow of displaying and moving timing marks TM and timing ball TB displayed upon the monitor screen by the sound game will be described while referencing the flowcharts of FIG. 14 through FIG. 20. It is noted that the steps of each flowchart described below are provided running each program component, which configures the game program, with the built-in CPU of the TV game machine described later. Furthermore, in the description below, particularly only the components relevant to the processing characteristic of the present invention, which allows the player to carry out simulated conducting and producing of music, are extracted and mentioned.

Overall Processing Flow of Sound Game

Figure 14:
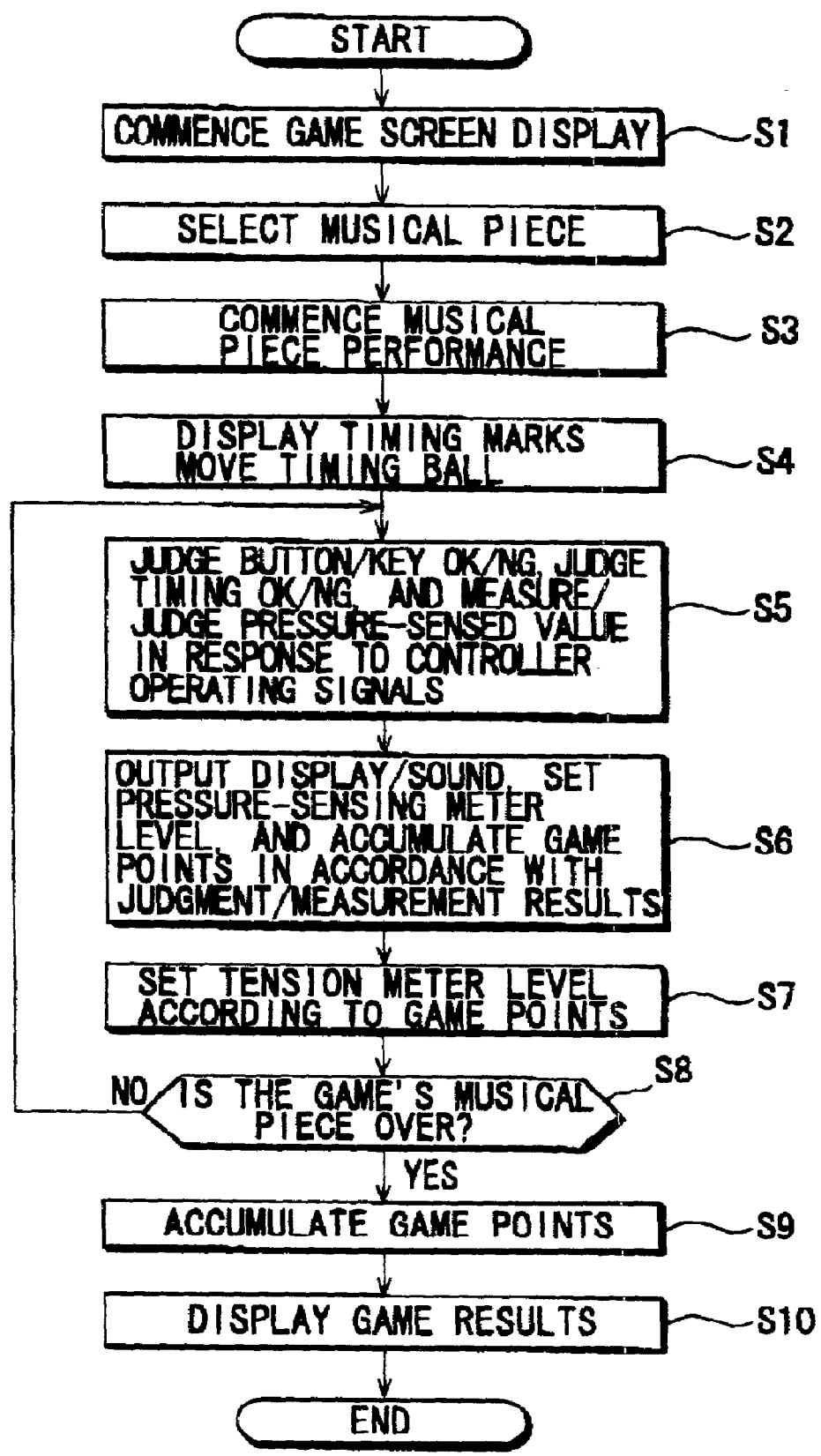
FIG. 14 is a flowchart showing the entire process associated with simulated conducting and producing of music for the sound game application program of this embodiment.

FIG. 14 shows an example of the overall flow of processing of game program 330 that allows the player to carry out the simulated conducting and producing of music.

To begin with, for example, when the switch of the TV game machine described later is turned ON and execution of the sound game commences by loading, for example, an optical disk and the like, during the processing of step S1, progression control program 341 displays upon a television monitor screen a game initial screen; moreover, during the processing of step S2, displays a menu screen and the like, which requests the player to select a musical piece to be performed in the sound game. It is noted that with he sound game of the present invention, the game program may allow for selection of musical pieces not only by the player, but also by automatic selection in accordance with progression of the game. When selection of a musical piece to be performed is carried out in step S2, sound control program 345 and musical piece management program 346 commence the performance of the musical piece during the processing of step S3.

Simultaneous to commenting the performance of the musical piece, during the processing of step S4, mark control program 247 and ball control program 348 display timing marks TM that are expressed by the distance among marks, number of marks, display color of each mark, symbol upon the mark and the like, according to the six types of elements of musical tempo, rhythm, beat, volume, part designations and sostenuto, which are acquired from musical piece management program 346; moreover, carries out the moving of timing ball TB.

While displaying of timing marks TM and moving of timing ball TB are being carried out, during the processing of step S5, based on the information such as the displaying condition of timing marks TM and the operating signals from the controller, and the movement conditions of timing ball TB and the like, progression control program 341 carries out the OK/NG judgment of timing on the beat; the OK/NG judgment of pushing buttons or keys according to color of the mark and the symbol upon the mark; measurement of the pressure-sensed value corresponding to the pushing pressure on the button and the OK/NG judgment thereof and the like while working together with controller management program 343, mark control program 347 and ball control program 348.

While displaying of timing marks TM and moving of timing ball TB are being carried out, during the processing of step S5, based on the results of the OK/NG judgment of timing on the beat; the OK/NG judgment of pushing buttons or keys based on symbol and the like upon the mark; and the measurement or the pressure-sensed value corresponding to the color of the marks, progression control program 341 carries out display and sound output of "Good!" or "Bravo!" or the like carried out for every measure, level display of the pressure-sensing meter 252, addition/subtraction of game points and the like while working together with image control program 344, sound control program 345, character control program 349 and meter management program 350.

Next, during he processing of step S7, meter management program 350 carries out level setting and display of tension meter 251 according to the game points obtained in step S6.

Next, during the processing of step S8, progression control program 341 judges whether or not the musical piece has ended, returns to the processing of step S4 when it has not ended, and when the end of the musical piece is judged, accumulates the game points during the processing of step S9.

Afterwards, during the processing of step S10, progression control program 341 displays upon the monitor screen the game results according to the accumulated game points and ends the sound game.

Hereafter, the main steps from each of the processes of the flowchart of FIG. 14 will be described.

Process Flow of Timing Mark Display and Timing Ball Movement

Figure 15:
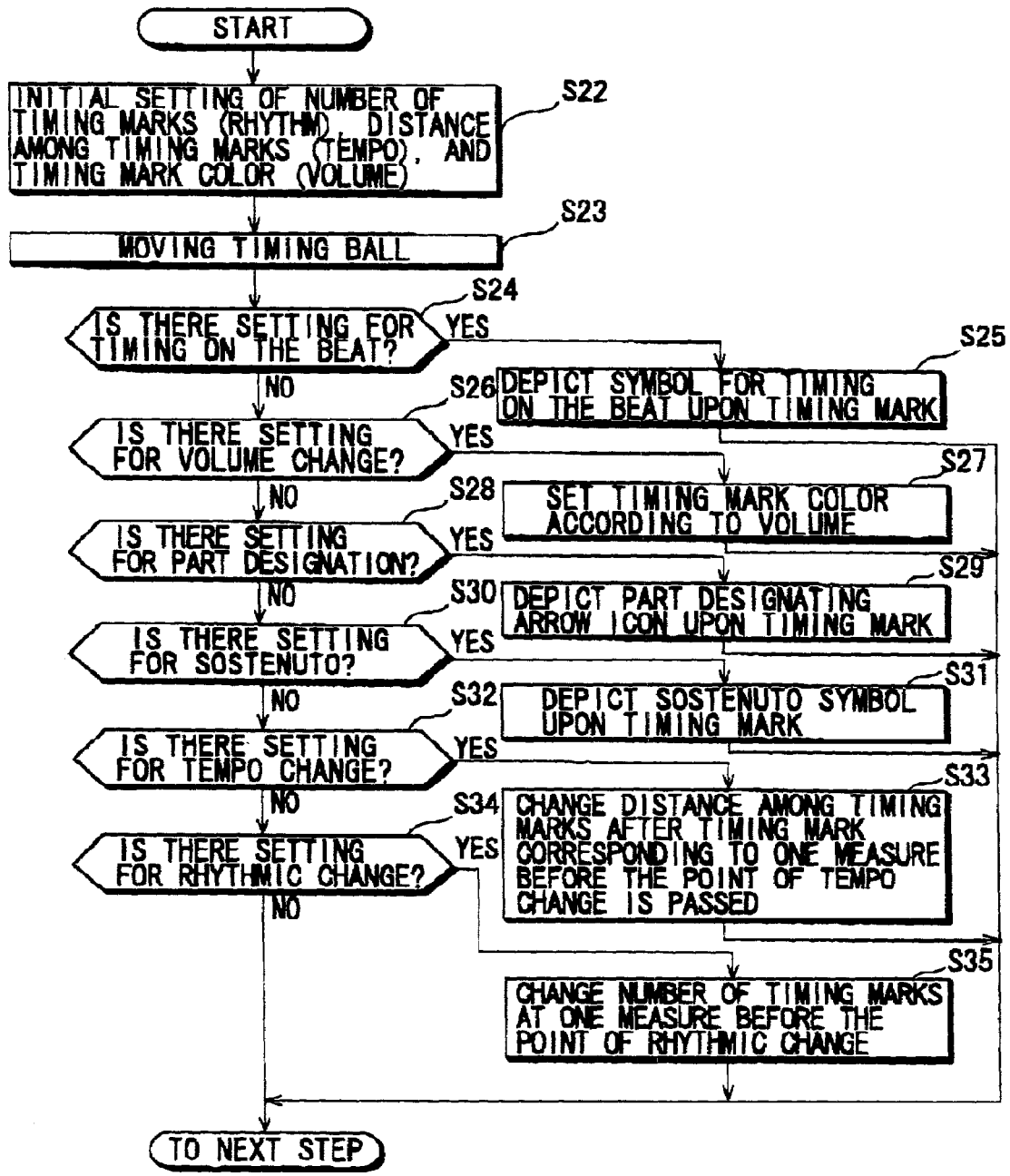
FIG. 15 is a flowchart showing a specific example of processing timing mark display and timing ball movement.

FIG. 15 shows a specific example of the process flow of timing mark display and timing ball movement in step S4 of the flowchart of FIG. 14.

In FIG. 15, when the musical piece performance commences in step S3 of FIG. 14, mark control program 347 and ball control program 348, to begin with, during the processing of step S22, carry out the initial settings of the number of timing marks TM, distance among the marks, mark color and the like according to the rhythm, tempo, volume and the like of the musical piece that musical piece management program 346 manages; moreover, during the processing of step S23, commences moving the timing ball.

Next, mark control program 347 and ball control program 348, based on the six types of elements of musical tempo, rhythm, beat, volume, part designations and sostenuto that musical piece management program 346 manages, judge during the processing of step S24 whether or not setting of the beat has been carried out for each rhythm of each measures; during the processing of step S26 whether or not setting of volume change has been carried out; during the processing of step S28 whether or not setting of the part designation has been carried out; during the processing of step S30 whether or not setting of sostenuto has been carried out; during the processing of step S32 whether or not setting of the tempo change has been carried out; and during the processing of step S34 whether or not setting of change of rhythm has been carried out. It is noted that the order that each judgment of these steps S24, S26, S29, S30, S32 and S34 is carries out is not limited to the example of FIG. 15.

Namely, when setting of the beat for each rhythm is carried out in step S24, during the processing of step S25, mart control program 347 depicts a symbol, which represents, for example, the "Δ" button upon the controller as the symbol prompting the player for timing on the beat, upon timing mark TM, which represents the beat.

When change setting of the volume for each beat (intensity of performance) is carried out in step S26, during the processing of step S27, mark control program 347 sets the color of timing mark TM that represents that beat to the color according to the specified value of the volume.

When setting of the part designation for each beat is carried out in step S28, during the processing of step S29, mark control program 347 depicts part designating arrow icon Pm, which corresponds to a direction key upon the controller, for example, as the symbol prompting the player for the part designation, upon timing mark TM, which represents that beat.

When setting of sostenuto for each beat is carried out in step S30, during the processing of step S31, mark control program 347 depicts a star mark Sm, for example, as the symbol prompting the player for sostenuto, upon timing mark TM that represents that beat.

When setting of tempo change for each measure is carried out in step S32, after timing ball TB passes timing mark TM that corresponds to, for example, on measure before the point where tempo change occurs, mark control program 347, during the processing of step S33, changes the distance between each timing mark TM in accordance with the tempo thereafter.

When setting of rhythmic change for each measure is carried out in step S34, after timing ball TB passes timing mark TM that corresponds to, for example, one measure before the point where the rhythm is altered, mark control program 347, during the processing of step S35, changes the number of the timing marks to the number of the marks in accordance with that altered rhythm.

Figure 16:
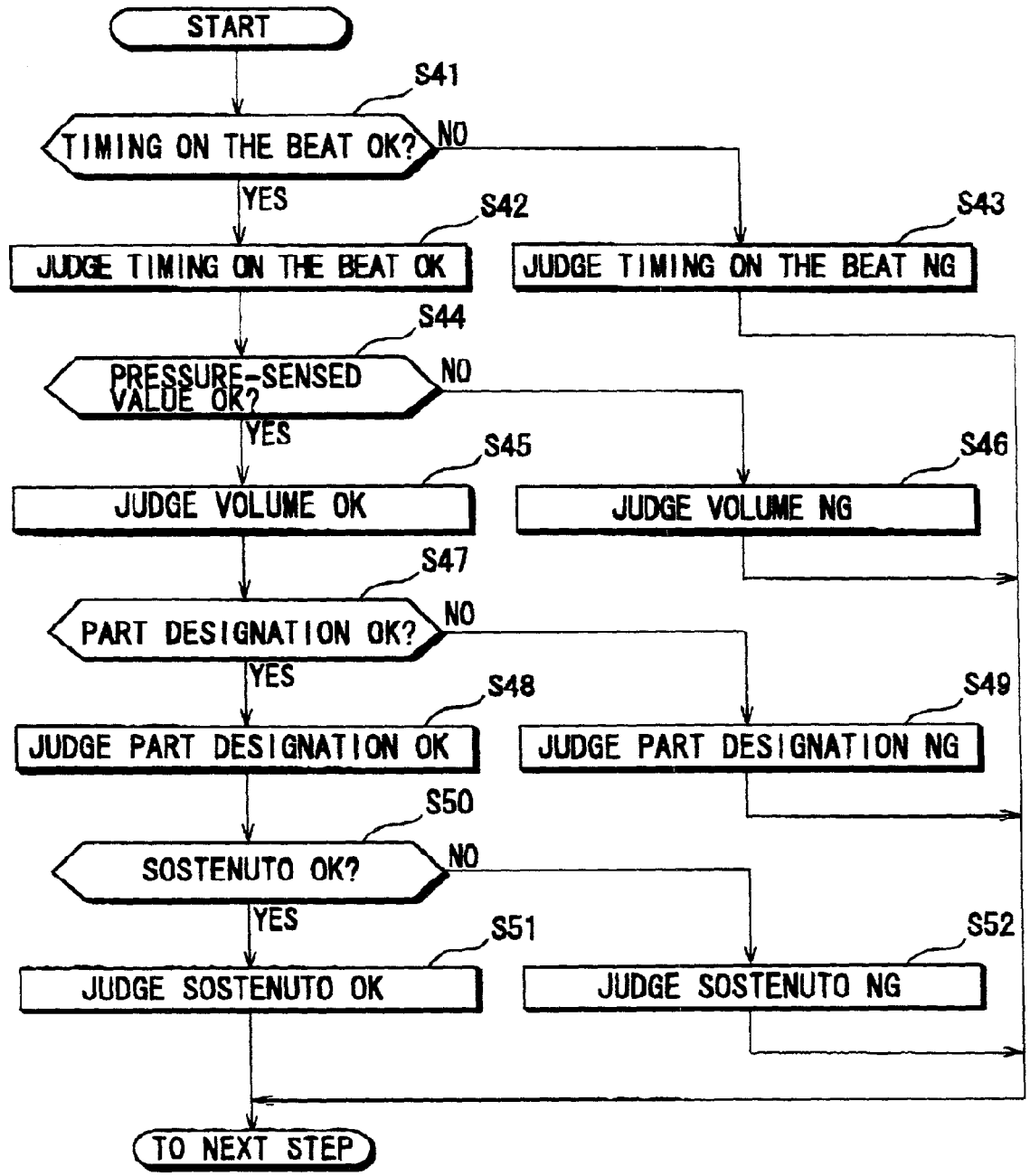

Process Flow of Button Pushing OK/NG Judgment, Pressure-Sensed Value Measurement and Judgment In FIG. 16, an example of the process flow of the OK/NG judgment of timing on the beat; the OK/NG judgment of pushing a button or key in response to color of the mark or the symbol upon the mark; the measurement ant OK/NG judgment of the intensity of the pushing pressure on the button (pressure-sensed value) and the like are shown in step S5 of the flowchart of FIG. 14. It is noses that each judging process shown in FIG. 16 is actually carried out simultaneously.

In FIG. 16, progression control program 341, based on the color and symbol upon timing mark TM that mark control program 347 controls; the moving of timing ball TB that ball control program 348 controls; and the ON operating signal for the button or key upon the controller that controller management program 343 manages, to begin with, during the processing of step S41, carries out judgment of whether or not the desired button upon the controller is manipulated to be ON at the point when timing ball TB overlaps upon the timing mark (with the timing on the beat).

When the desired button is manipulated to be ON with the timing on the beat in step S41, progression control program 341, during the processing of step S42, carries out an OK judgment for the timing on the beat. On the other hand, in step S41, when the desired button is not manipulated to be ON with the timing on the beat, progression control program 341, during the processing of step S43, carries out an NG judgment for the timing on the beat.

Next, progression control program 341, based on the mark color of the timing marks TM (namely volume size) that mark control program 347 controls; the moving of timing ball TB that ball control program 348 controls; and the ON operating signal for the button or key upon the controller that controller management program 343 manages, during the processing of step S44, carries out judgment for whether or not the pressure sensitive value, which represents the magnitude of the pushing pressure on the desired button upon the controller, is set at the value corresponding to the volume set for each beat (for each timing mark).

When it is judged in step S44 that the pressure-sensed value of the pushing pressure on the button is the value corresponding to the set volume, progression control program 341 carries out a volume OK judgment during the processing of step S45. On the other hand, when it is judged that the pressure-sensed value of the pushing pressure on the button is not the value corresponding to the set volume, progression control program 341 carries out a volume NG judgment during the processing of step S46.

It is noted that controller management program 343 measures at every $1/60^{th}$ second the magnitude of the pushing pressure on the button upon the controller as the pressure-sensed value expressed in 256 levels; moreover, based on four consecutive pressure-sensed values that are acquired at every $1/60^{th}$ second, carries out a pushing pressure judgment for during the button ON manipulation by the player. More specifically, when the player is requested to carry out the ON manipulation of a button for high volume (perform "strong"), controller management program 343 extracts as the value of the pushing pressure on the button by the player the maximum pressure-sensed value from the four consecutive pressure-sensed values acquired at every $1/60^{th}$ second when the button is manipulated to be ON. On the other hand, when the player is requested to carry out the ON manipulation of a button for low volume (perform "weak"), controller management program 343 extracts as the value of the pushing pressure on the button by the player the minimum pressure-sensed value from the four consecutive pressure-sensed values acquired at every $1/60_{th}$ second when the button is manipulated to be ON. Moreover, when the player is requested to carry out the ON manipulation of a button for medium volume (perform "middle"), controller management program 343 extracts as the value of the pushing pressure on the button by the player the pressure-sensed value almost in the middle from the four consecutive pressure-sensed values acquired at every $1/60^{th}$ second when the button is manipulated to be ON. Judgment of the pushing pressure is carried out based on the four consecutive pressure-sensed values as described above because as the button ON manipulation by man is not strongest or weakest the instant the button is pushed, whereby if the pushing pressure on the button is only judged at the instant the button is pushed, the probability of the player's intended button pushing pressure that is not being judged is high. Furthermore, the game program is capable of setting the intensity of the pushing pressure on the button using the initial screen and the like. In other words, the player can preset the pushing force of the button that he/she pushed, and the degree of intensity thereof that the game program will judge.

Next, progression control program 341, based on the symbol (in this case, the direction that the arrow mark of part designating arrow icon Pm points) upon timing mark TM, which mark control program 347 controls; the move of timing ball TB, which ball control program 348 controls; and the operating signal of the direction keys upon the controller, which controller management program 343 manages, during the processing of step S47, carries out judgment of whether or not the direction key corresponding to the direction part instruction arrow icon Pm is pointing has been pushed at the point when timing ball TB overlaps upon timing mark TM on which part designating arrow icon Pm is depicted.

When it is judged in step S47 that the direction key corresponding to the direction that part designating arrow icon Pm is pointing has been pushed, progression control program 341 carries out an OK judgment for the part designation during the processing of step S48. On the other hand, when it is judged in step S47 that the direction key corresponding to the direction that part designating arrow icon Pm is pointing has not been pushed, progression control program 341 carries out a part designation NG judgment during the processing of step S49.

Next, based on the symbol (in this case, star mark Sm) upon timing mark TM, which mark control program 347 controls; the move of timing ball TB, which ball control program 348 controls; and the operating signal of the desired button upon the controller, which controller management program 343 manages, during the processing of stop S50, progression control program 341 carries out judgment of whether or not the desired button has seen pushed just for the set duration at the point when timing ball TB overlaps upon timing mark TM on which part star mark Sm is depicted.

When it is judged in step S50 that the desired button and been pushed just for the set duration, progression control program 341 carries out a sostenuto designation OK judgment during the processing of step S51. On the other hand, when it is judged in step S50 that the desired button has not been pushed just for the set duration, progression control program 341 carries out a sostenuto designation NG judgment during the processing of step S52.

Figure 17:
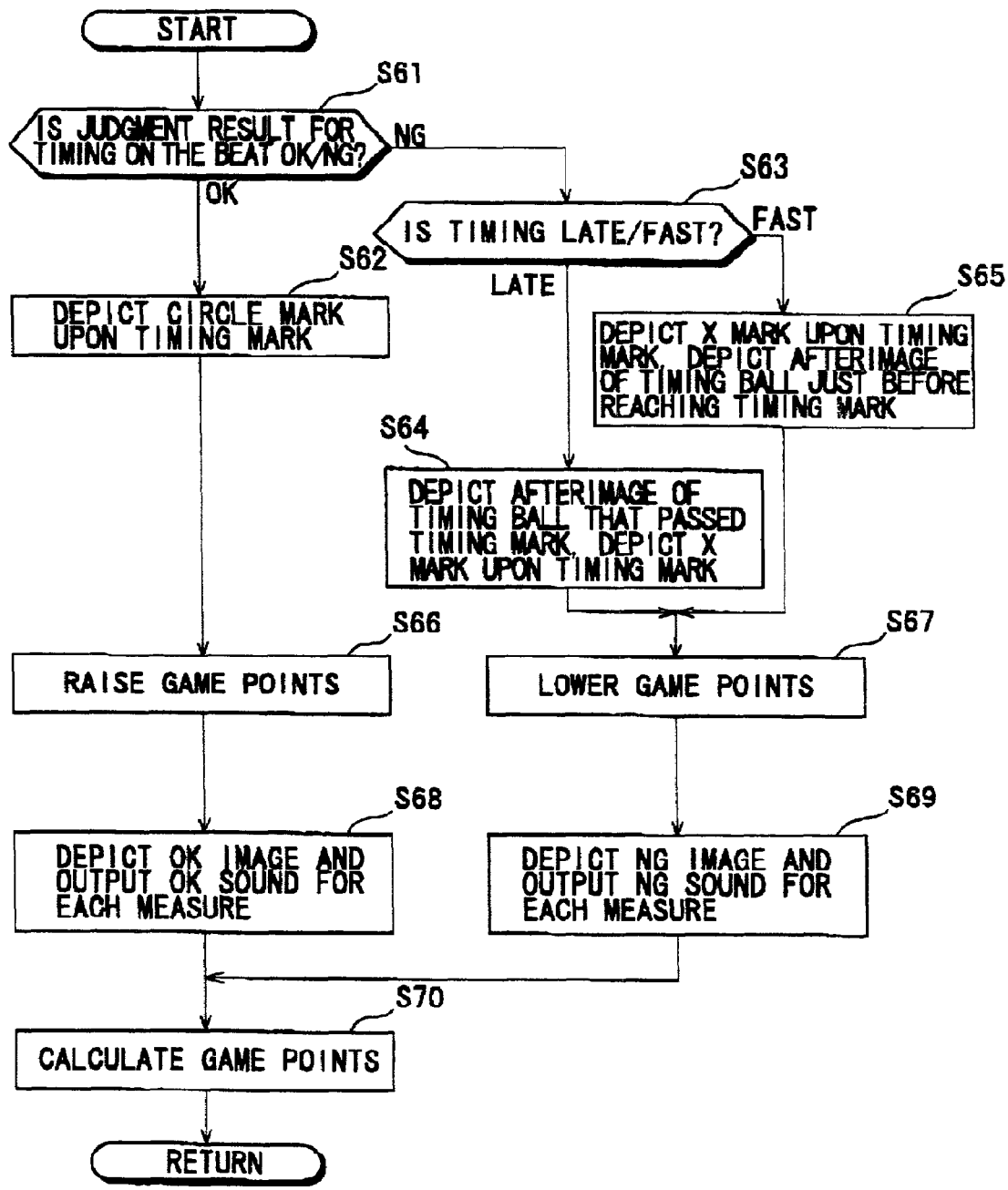
FIG. 17 is a flowchart showing an example of processing display and sound output according to OK/NG judgment results of the timing on the beat.

Process Flow of Display, Sound Output, Game Point Calculations and the lake in Response to Judgment Results Process Flow in Response to OK/NG Judgment Results of Timing on the Beat In FIG. 17, an example of the process flow of the display and sound output according to the OK/NG judgment result of the timing on the beat from the processing carried out in step S6 of the flowchart of FIG. 14 is shown.

In FIG. 17, during the processing of step 61, progression control program 341 judges if the result of the OK/NG judgment for the timing on the beat, which is acquired by the processing of steps S41, S42 and S43 of FIG. 16, is OK or NG.

When it is judged as OK an step S61, during the processing of step S62, progression control program 341 displays circle mark Gm upon timing mark TM corresponding to each beat while working together with image control program 344.

Next, progression control program 341 raises the game points during the processing of step S66; moreover, carries out the display and sound output of "Good!" or "Bravo!" or the like for every measure during the processing of step S68, On the other hand, when it is judged as NG in step S61, during the processing of step S63, progression control program 341 carries out judgment of whether the timing of the pushing manipulation of the button is slower or faster than the timing on the beat.

When it is judged as being slow in step S63, during the processing of step S64, progression control program 341 depicts an afterimage of timing ball TB that has passed (traversed) timing mark TM as well as depicts x mark Bm upon that timing mark TM.

On the contrary, when it is judged as being fast in step S63, during the processing of step S65, progression control program 341 depicts X mark Bm upon a timing mark as well as depicts an afterimage of timing ball TB just before that timing mark TM.

After these steps S64 and S65, progression control program 341 lowers the game points during the processing of step S67; moreover, carries out the display and sound output of "Bad!" or a skull mark or the like for each measure during the processing of step S69.

After the processing of steps S68 and S69, during step S70, progression control program 341 calculates the game points in response to the judgment results of the timing on the beat, proceeding to the next process.

Figure 18:
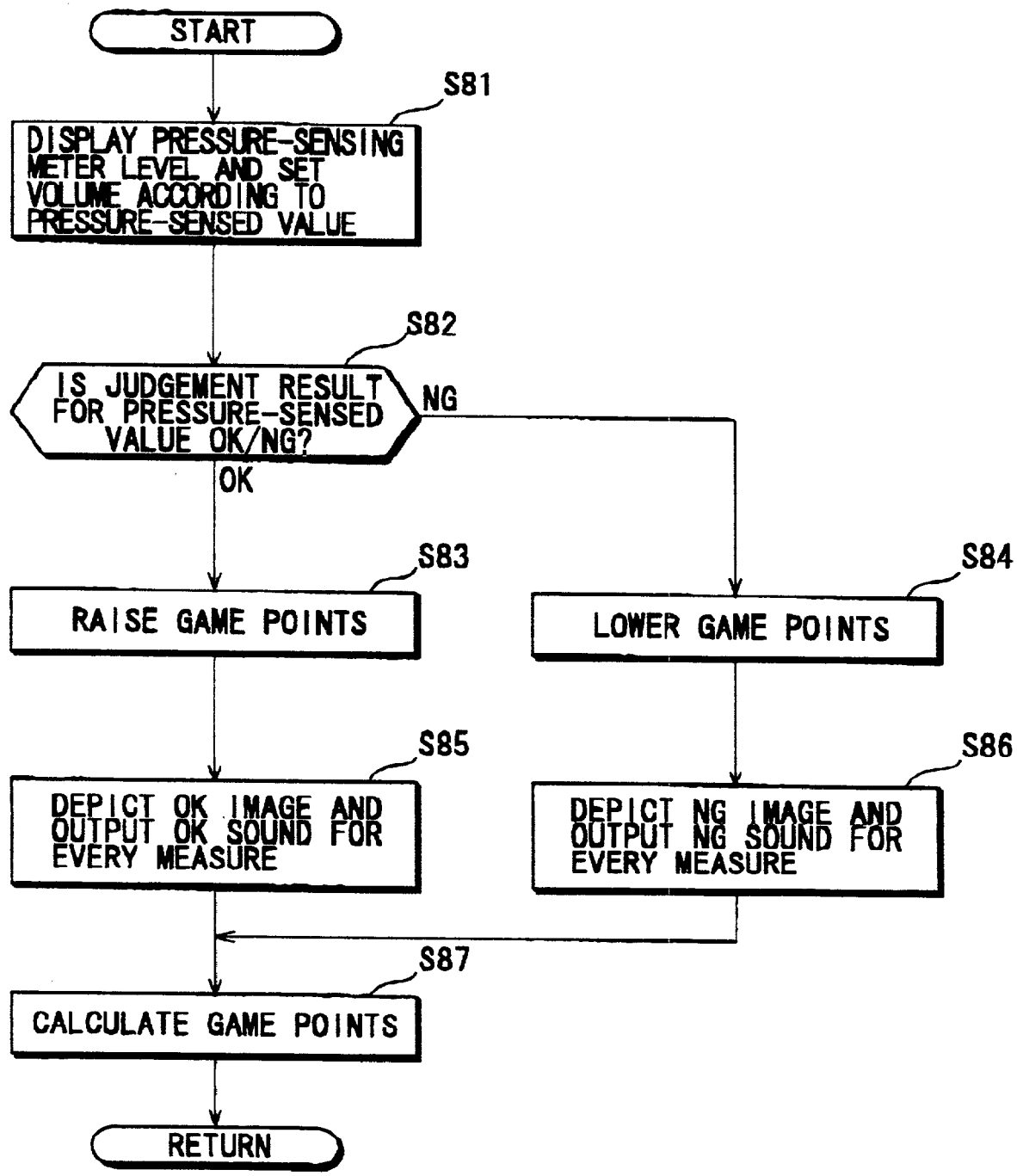
FIG. 18 is a flowchart showing an example of processing display and sound output according to OK/NG judgment results of the pressure-sensed value.

Process Flow of Display and Sound Output and the like in Response to Pressure-Sensed Value Judgment Results In FIG. 18, an example of the process flow of the display and sound output an response to the pressure-sensed value OK/NG judgment result from the processing carried out in step S6 of the flowchart of FIG. 14 is shown.

In FIG. 18, based on the pressure-sensed value according to the pushing pressure on the button, which controller management program 343 manages, progression control program 341, during the processing of step 81, controls the display level of pressure-sensing meter 252 as well as carries out the setting of the volume corresponding to that same pressure-sensed value.

Next, during the processing of step S82, progression control program 341 judges whether the pressure-sensed value OK/NG judgment result, which is acquired by the processing of steps S44, S45 and S46 of FIG. 16, is OK or NG.

When it is judged as OK in step S82, progression control program 341 raises the game points during the processing of step S83; moreover, carries out the display and sound output of "Good!" or "Bravo!" or the like for each measure during the processing of step S85, On the other hand, when it is judged as NG in step S82, progression control program 341 lowers the game points during the processing of step S84; moreover, carries out the display and sound output of "Bad!" or depicts a skull mark or the like for each measure during the processing of step S86.

After the processing of steps S85 and S86, progression control program 341, during step S87, calculates the game points according to the pressure-sensed value judgment result, proceeding to the next process.

It is noted that the case of the process concerning this pressure-sensed value judgment result is also similar to the case of the OK/NG judgment for the timing on the beat, wherewith circle mark Gm may be displayed upon each timing mark TM in response to the OK/NG judgment result for the pressure-sensed value, or contrarily X mark Bm may be displayed.

Figure 19:
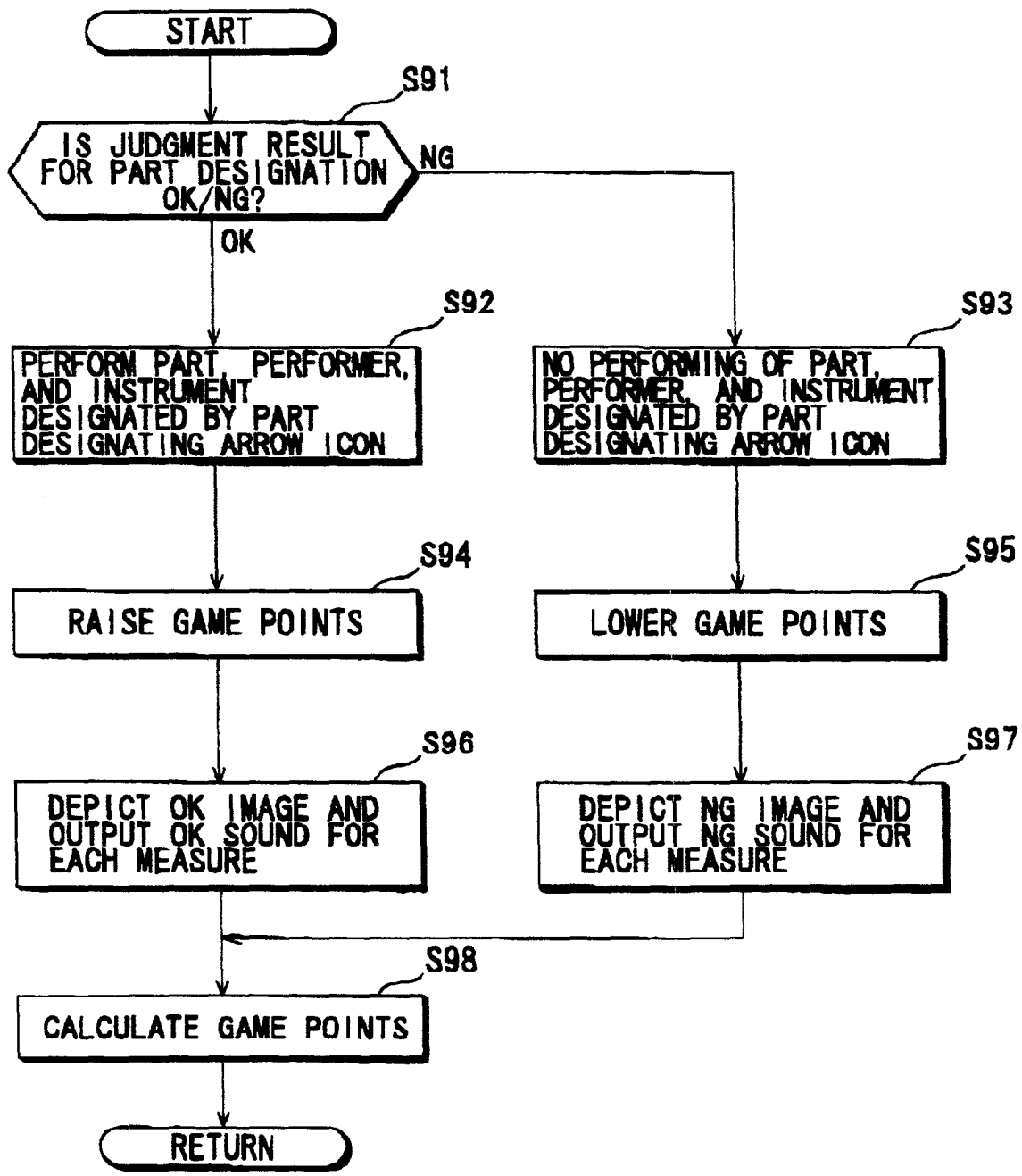
FIG. 19 is a flowchart showing an example of processing display and sound output according to part indication judgment results.

Process Flow of Display and Sound Output and the like in Response to Part Designation Judgment Results In FIG. 19, an example of the process flow of the display and sound output according to the part designation judgment result from the processing carried out an step S6 of the flowchart of FIG. 14 is shown.

In FIG. 19, during the processing of step 91, progression control program 341 judges if the result of the part designation judgment, which is acquired by the processing of steps S47, S48 and S49 of FIG. 16, is OK or NG.

When it is judged as OK in step S91, during the processing of step S92, progression control program 341 carries out performing of a part, musical performer or instrument corresponding to the direction designated by part designating arrow icon Pm working together with image control program 344 and sound control program 345.

Next, progression control program 341 raises the game points during the processing of step S94; moreover, carries out the display and sound output of "Good!" or "Bravo!" or the like for each measure during the processing of step S96.

On the other hand, when it is judged as NG in step S91, during the processing of step S93, progression control program 341 does not carry out performing of a part, musical performer or instrument corresponding to the direction indicated by part designating arrow icon Pm.

Next, progression control program 341 lowers the game points during the processing of step S95; moreover, carries out the display and sound output of "Bad!" or depicts a skull mark or the like for each measure during the processing of step S97.

After steps S96 and S97, progression control program 341, during step S98, calculates the game points an response to the part designation judgment result, proceeding to the next process.

It is noted that the case of the process concerning this part designation judgment result is also similar to the case of the OK/NG judgment for the timing on the beat, wherewith circle mark Gm may be displayed upon each timing mark TM in response to the OK/NG judgment result for the part designation, or contrarily X mark Bm may be displayed.

Figure 20:
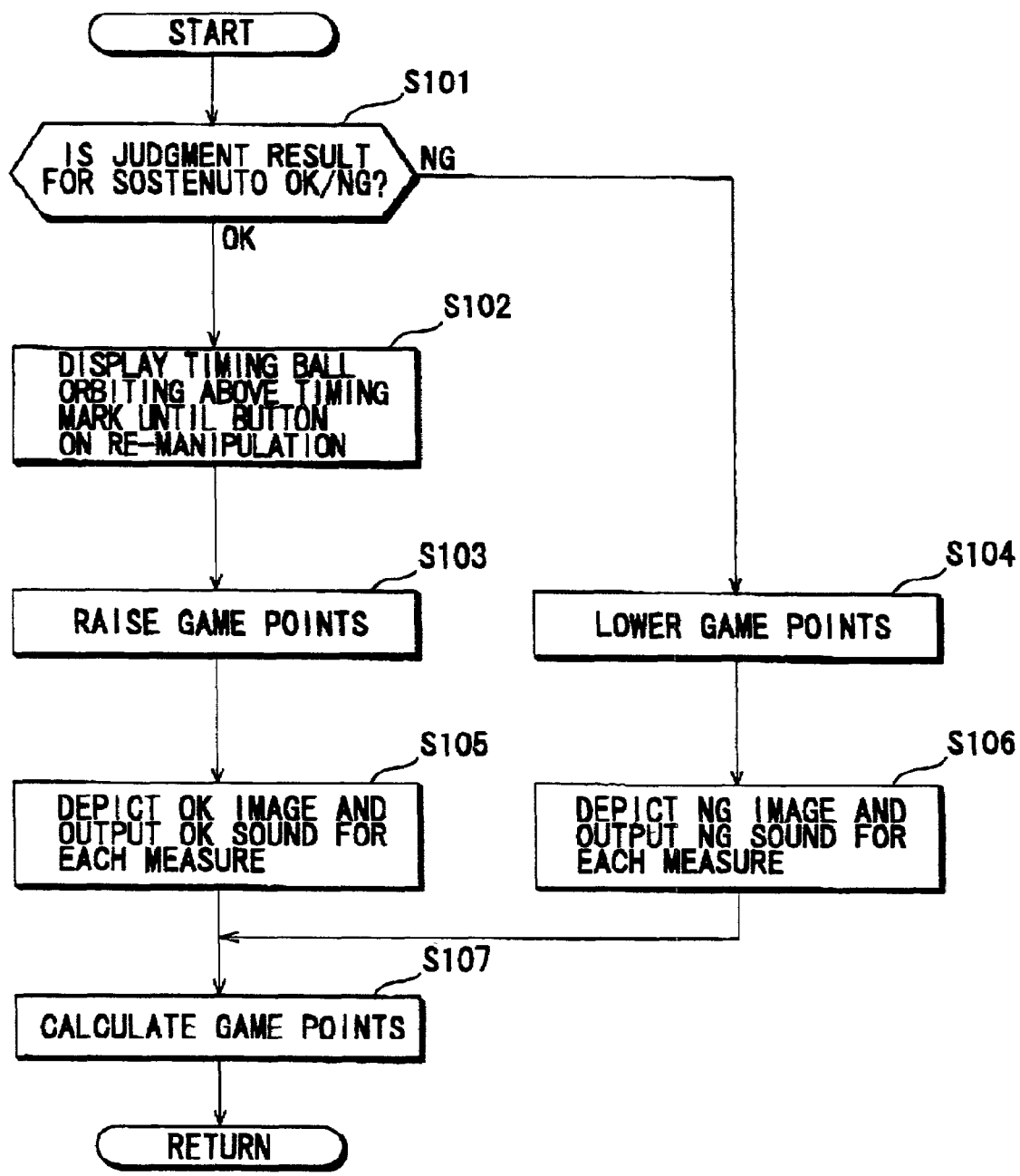
FIG. 20 is a flowchart showing an example of processing display and sound output according to sostenuto judgment results.

Process Flow of Display and Sound Output and the like in Response to Sostenuto Judgment Results In FIG. 20, an example of the process flow of the display and sound output in response to the sostenuto OK/NG judgment result from the processing carried out in step S6 of the flowchart of FIG. 14 is shown.

In FIG. 20, during the processing of step S101, progression control program 341 judges if the result of the sostenuto judgment, which is acquired by the processing of steps S50, S51 and S52 of FIG. 16, is OK or NG.

When it is judged as OK in step S101, during the processing of step S102, progression control program 341 working together with controller management program 343 and image control program 344 displays timing ball TB orbiting above timing mark TM which has depicted star mark Sm until the desired button upon the controller is manipulated to be ON again.

Next, progression control program 341 raises the game points during the processing of step S103; moreover, carries out the display and sound output of "Good!" or "Bravo!" or the like for each measure during the processing of step S105.

On the other hand, when it is judged as NG in step S101, progression control program 341 lowers the game points during the processing of step S104; moreover, carries out the display and sound output of "Bad!" or depicts a skull mark or the like for each measure during the processing of step S106.

After steps S105 and S106, progression control program 341, during step S107, calculates the game points in response to the sostenuto judgment result, proceeding to the next process.

It is noted that the case of the process concerning this sostenuto judgment result is also similar to the case of the OK/NG judgment for the timing on the beat, wherewith circle mark Gm may be displayed upon each timing mark TM in response to the OK/NG judgment result for sostenuto, or contrarily X mark Bm may be displayed.

TV Game System for Realizing Sound Game

Figure 21:
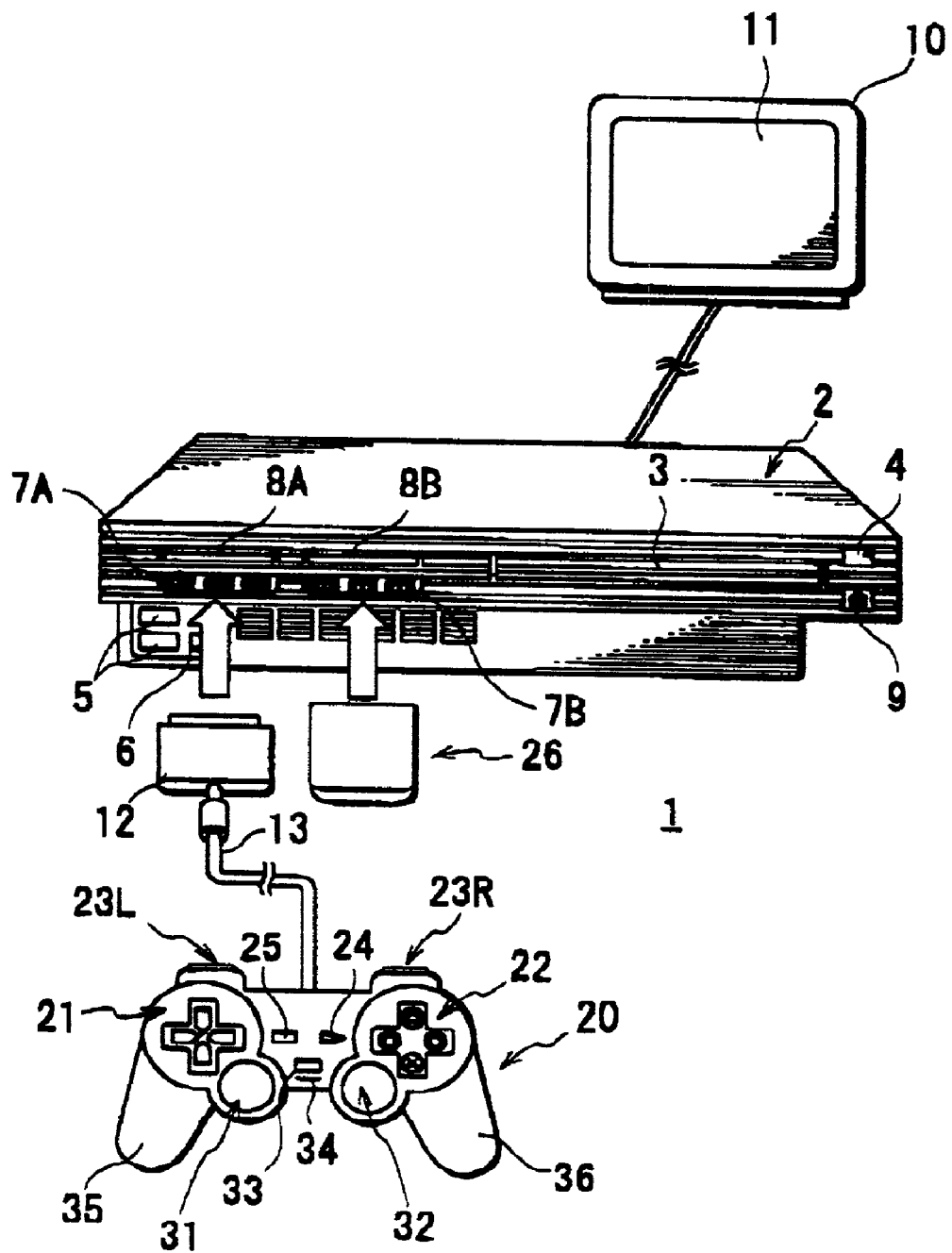
FIG. 21 is a schematic diagram showing an example of the schematic structure of the main sections of the TV game system of the embodiment of the present invention.

Next, the schematic structure of TV game system 1 as an embodiment capable of realizing such aforementioned sound game is illustrated in FIG. 21.

As can be understood from FIG. 21, TV game system 1 is an entertainment system comprises of TV game machine 2 as a program execution apparatus, controller 20 and television monitor 10. TV game machine 2 not only executes the aforementioned sound game, but also has the function of carrying out playback of movies and the like. Controller 20 is connected to the TV game machine 2 and comprises various buttons and direction keys and the like, which are operation terminals that are manipulated by the user (player). Television monitor 10 displays game content and movies and the like as well as outputs sound.

Brief Description of TV Game

TV game machine 2 comprises memory card slots 8A, 8B; controller ports 7A, 7B; disk tray 3; buttons 4 and 9; Institute of Electrical and Electronics Engineers (IEEE) 1394 connector 6; and Universal Serial Bus (USB) connector 5 and the like. Memory card slots 84, 8B are configured as such so that memory card 26 is freely attachable/removable. Controller ports 7A, 7B are configured as such so that connector 12 of cable 13, which is connected to the game controller 20, is freely attachable/removable. Disk tray 3 is configured as such so that optical disks, for example, DVD-ROMs and CD-ROMs, may be loaded. Button 9 is an OPEN/CLOSE button for opening/closing disk tray 3. Button 4 is an ON/STANDBY/RESET button for turning the power on or into standby, or resetting a game. Furthermore, it has been omitted from the figures, however, a power supply switch, audio/visual output terminal (multi AV output terminal), PC card slot, optical/digital output terminal, AC power input terminal and the like are provided on the back panel of the TV game machine 2.

TV game machine 2 executes games in accordance with commands from a player via a game program and controller 20. The game program may be either one that is read from various recording media for example, optical disks such as the CD-ROMs and DVD-ROMs and semiconductor memory, or one that is downloaded via various transmission media such as phone lines, LANs, CATV lines and communications satellite lines. It is noted that game execution mainly indicates proceeding with a game by controlling sound (game sound) of an audio apparatus or images (game images) within a game screen, which is displayed upon screen 11 of television monitor 10 connected to TV game machine 2, according to commands by the player via controller 20. In the case of TV game machine 2 shown in FIG. 21, two controllers 20 may be connected to controller ports 7A and 7B, and by utilizing these two controllers, two players may carry out various games. For example, various game data generated by execution of the TV game are stored (saved) on memory card 26, which is loaded into memory card slot 8A or 8B; therefore, during subsequent games, continuation and the like of the game may be carried our by utilizing those saved game data.

Moreover, TV game machine 2 can not only execute a TV game based on the game program, but can also play back (decode), for example, audio data, which is recorded on a CD, or a video such as a movie or audio data, which is recorded on a DVD. Furthermore, it is possible for TV game machine 2 to operate based on various application programs other than games. It is noted that a driver program for carrying out play back of DVDs is saved on memory card 26, for example. Accordingly, TV game machine 2 reads the driver program that is for carrying out play back of DVDs from memory card 26, which is loaded into memory card slot 8A or 8B, so as to carry out playing back of a DVD based on that driver program.

Brief Description of Controller

The controller 20 comprises left grip 35, right grip 36, left operation part 21 and right operation part 22, left analog operation part 31 and right analog operation part 32, first left pushbutton 23L, second left pushbutton not shown in the figures, first right pushbutton 23R and second right pushbutton not shown in the figures and the like. Left grip 35 is a portion for the player to grip so as to hold it with the palm of the left hand. Right grip 36 is a portion for the player to grip so as to hold it with the palm of the right hand. Left operation part 21 and right operation part 22 are portions for the player to respectively operate with the left and right thumbs in the state where those grips 35, 36 are gripped with the left and right hands. Left analog operation part 31 and right analog operation part 32 are portions for the player to respectively analog operate (operate the joystick) with the left and right thumbs in the state where grips 35, 36 are gripped with the left and right hands. First left pushbutton 23L and the second left pushbutton not shown in the figure that are positioned there below are buttons for the player to respectively operate by depressing with the Left index finger and middle finger, for example. First right pushbutton 23R and the second right pushbutton not shown in the figures that are positioned there below are buttons for the player to respectively operate by depressing with the right index finger and middle finger, for example.

"Up", "down", "left", "right" direction keys, which the player operates when, for example, moving up, down, left or right upon a screen a game character, and when carrying out instructions for parts, performer and musical instruments (part designations) in the sound game, are provided on left operation part 21. It is noted that the "up", "down", "left", "right" direction keys are not only directional commanded of upwards, downwards, leftwards or rightwards, but may be utilized for directional commands in diagonal directions. For example, by depressing the "up" direction key and "right" direction key simultaneously, the player may give a directional command of an upper-right diagonal direction to TV game machine 2 it is the same with the other keys, wherewith, for example, by depressing the "down" direction key and "left" direction key simultaneously, the player may give a directional command of a lower-Left diagonal direction to TV game machine 2.

Right operation part 22 is manipulated to be ON during timing of the beat, changing the volume or sostenuto and while setting and executing the game character functions; moreover, has four command buttons ("Δ", "□", "×", "○"buttons respectively provided with Δ, □, ×, ○ shaped stamps), which also function as buttons capable of detecting the pushing pressure. Each command button is respectively assigned different functions by the game program. For example, the "Δ" button is assigned a function for specifying menu display; the "×" button, for example, is assigned a function for specifying the deletion and such of selected items; the "□" button, for example, is assigned a function for specifying the determination and such of selected items; and the "○" button, for example, is assigned a function for specifying the display/not display of the table of contents and such. It is noted that the functions assigned to each of these buttons and keys are an example, wherein various functions may be assigned by the game program.

Left analog operation part 31 and right analog operation part 32 are held in an upright state (non-diagonal state) position (standard position) during non-inclined operations. When left analog operation part 31 end right analog operation part 32 are manipulated at an inclination, controller 20 detects coordinate values of the XY coordinates according to the amount of slant and direction in contrast to the standard position, wherein those coordinate values are transmitted to TV game machine 2 as operation output.

Furthermore, controller 20 comprises mode selection switch 33, light display 34, select button 25, start button 24 and the like. Mode selection switch 33 is a switch for performing the selection of the operation mode, which makes the functions of left and right operation parts 21, 22 and left and right analog operation parts 31, 32 operate (analog operation mode) or stop (digital operation mode). Light display 34 comprises a light emitting diode (LED) for the user to recognize the selected operation mode by displaying light. Start button 24 is a button for the player to command execution start, restart, pause and the like of a game. Select button 25 is a button for the player to command the displaying and such of the menu display or operation panel upon monitor screen 11. It is noted that in the case where the analog operation mode is selected by mode selection switch 33, light display 34 is controlled to turn ON, resulting in left and right analog operation parts 31, 32 to be in an operating state. On the other hand, in the case where the digital operation mode is selected, light display 34 is controlled to turn off, resulting in left and right analog operation parts 31, 32 to be in a non-operating state.

When various buttons or operation parts upon controller 20 are manipulated, controller 20 transmits to TV game machine 2 via cable 3 operation signals according to those operations.

Moreover, controller 20 also comprises a vibration generating mechanism within the left and right grips 35, 36. The vibration generating mechanism comprises a weight eccentric from the rotation axis of a motor, for example, and the motor rotates that weight so as to vibrate controller 20. This vibration generating mechanism operates in conformity with commands from TV game machine 2. By causing the vibration generating mechanism to operate, controller 20 conveys the vibration to the player's hand.

Internal Configuration of TV Game Machine

Next, an outline of the internal circuitry of TV game machine 2 of this embodiment will be described using FIG. 22.

TV game machine 2 comprises main CPU 100, graphic processing unit (GPU) 110, IO processor (IOP) 120, optical disk player 130, main memory 160, MASK-ROM 150, and sound processing unit (SPU) 140 and the like. Main CPU 100 performs signal processing and the control of internal main structural elements based on various application programs such as game programs for realizing the aforementioned sound game. GPU 110 performs image processing. IOP 120 performs interfacing between the exterior and interior of the apparatus and processing for maintaining downward compatibility. Main memory 160 has the function of a buffer that temporarily houses data read from optical disks or the work area of the main CPU 100. MASK-ROM 150 houses, for example, an operating system program that main CPU 100 and IOP 120 mainly execute. SPU 140 performs acoustic signal processing. Optical disk player 130 performs playback of optical disks such as the DVDS and CDs, which are recorded with application programs or multi-media data. Furthermore, optical disk player 130 is comprised of a spindle motor, optical pickup, RF amp 131 and sliding mechanism and the like. The spindle motor rotates optical disks such as DVDs and CDs. The optical pickup reads the signals that are recorded on the optical disks. The sliding mechanism moves the optical pickup along the disk radius RF amp 131 amplifies the output signal from the optical pickup.

Moreover, TV game machine 2 also has CD/DVD digital signal processor 170 (hereafter notated as DSP 170), driver 180, mechanical controller 190 and card-type connector 200

(hereafter notated as PC card slot 200). By digitizing output signals from RF amp 131 of optical disk player 130, and applying, for example, error correction processing (CIRC processing) or expand/encode processing and the like, DSP 170 plays back signals that are recorded on the optical disks. Driver 180 and mechanical controller 190 perform rotation control of the spindle motor of optical disk player 130; focus and tracking control of the optical pickup; and loading control of the disk tray and the like. PC card slot 200 is an interface device for connecting, for example, a communication card and external hard disk drive and the like.

Each of these parts is respectively connected to the other mainly via bus lines 202, 203 and the like. It as noted that main CPU 100 and GPU 110 are connected by a dedicated bus furthermore, main CPU 100 and IOP 120 are connected by the SBUS. IOP 120, DSP 170, MASK-ROM 150, SPU 140 and PC card slot 200 are connected by the SBUS.

By executing an operating system program for the main CPU that is stored on MASK-ROM 150, main CPU 100 controls all operations of TV game machine 2. Main CPU 100 controls operations of he game and the like of TV machine 2 by executing various application programs and the like including game programs for sound games, which are read from optical disks, for example, CD-ROMs and DVD-ROMs and the like, so as to be loaded into main memory 160, or downloaded via communication networks.

By executing an operating system program for the IOP, which is stored on MASK-ROM 150, IOP 120 controls the input/output of data from memory card 26, which stores signals and game settings and the like from controller 20 according to the player's operations, and input/output of data of USB connector 5, IEEE 1394 connector 6, PC card slat 200 and the like, as well as performs data protocol conversion and the like.

GPU 110 has the function of a geometry transfer engine that performs processing of coordinate transformation and the like, and the function of a rendering processor; and performs drawing according to the drawing command from main CPU 100 so as to house the drawn images in a frame buffer not shown in the figures. More specifically, for example, in the case where various application programs, which are recorded on optical disks, are utilized for so-called 3-dimensional (3D) graphics such as TV games, the GPU 110 performs coordinate calculations and the like by geometric operation processing of polygons for configuring 3-dimensional objects; moreover, calculations, namely perspective transformation (calculations of coordinates and such of the vertexes of each polygon comprising a 3-dimensional object when it is projected upon a virtual camera screen) are performed by rendering processing for generating an image, which is acquired by photographing this 3-dimensional object with a virtual camera so as to write the ultimately acquired image data upon the frame buffer. Then, GPU 110 outputs video signals corresponding to this formed image.

SPU 140 comprises an adaptive differential pulse code modulation (ADPCM) decode function, audio signal playback function, signal modulation function and the like. The ADPCM decode function is a function for decoding acoustic data that has been adaptive prediction encoded. The audio signal playback function is a function for playing back and outputting audio signals such as sound effects by reading waveform data, which is stored in an internal or external sound buffer (not shown in the figures) of the SPU 140. The signal modulation function is a function for generating various sound waveform data by modulating waveform data, which is stored in the sound buffer. More specifically, the SPU 140, based on commands from main CPU 100, generates audio signals such as musical tones and sound effects and the like from waveform data, which is stored in the sound buffer, and also operates as a so-called sampling sound source.

When TV game machine 2 having the configuration as the above, for example, is energized, an operating system program for the main CPU and an operating system program for the IOP are respectively read from MASK-ROM 150, wherewith the corresponding operating system program for main CPU 100 and IOP 120 are executed. Accordingly, main CPU 100 centrally controls each part of TV game machine 2. IOP 120 controls the input/output of signals with controller 20, memory card 26 and the like. When the operating system program is executed, after main CPU 100 performs initialization processing such as checking of operations and the like, a game program that is recorded on an optical disk is read by controlling optical disk player 130, wherewith after loading into main memory 160, that game program is executed. By the execution of this game program, main CPU 100 controls GPU 110 and SPU 140 according to the player's command accepted from controller 20 via IOP 120, and controlling the display of images and generation of sound effects and musical tones. It is noted that the case where playback of movies and the like recorded on optical disks, for example, is the same as with TV game machine 2. Namely, main CPU 100 controls GPU 110 and SPU 140 according to the player's command accepted from controller 20 via IOP 120, and controlling the display of movie images played back from optical disks and the generation of sound effects and musical tones and the like.

Means for Detecting Pushing Pressure during Button ON Manipulation

The "Δ", "□", "×", "○" buttons of right operation part 22 of controller 20 are respectively configured as pressure-sensitive buttons capable of detecting pushing pressure.

Figure 23:
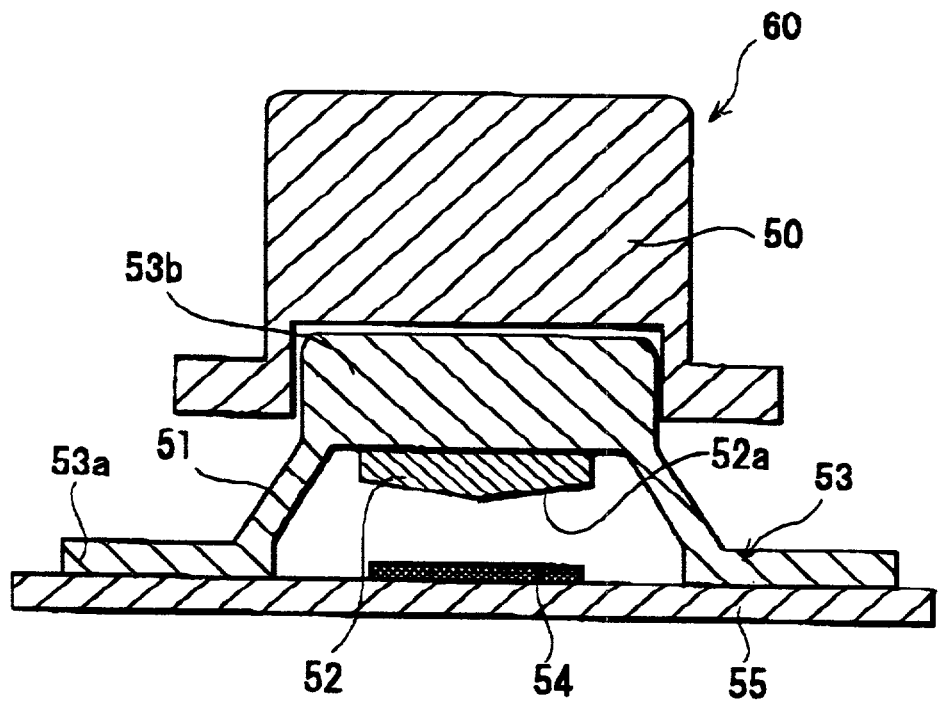
FIG. 23 is a cross-sectional view cut along a line in the pressure direction of a pressure-sensitive button in a non-pushed condition.
Figure 24:
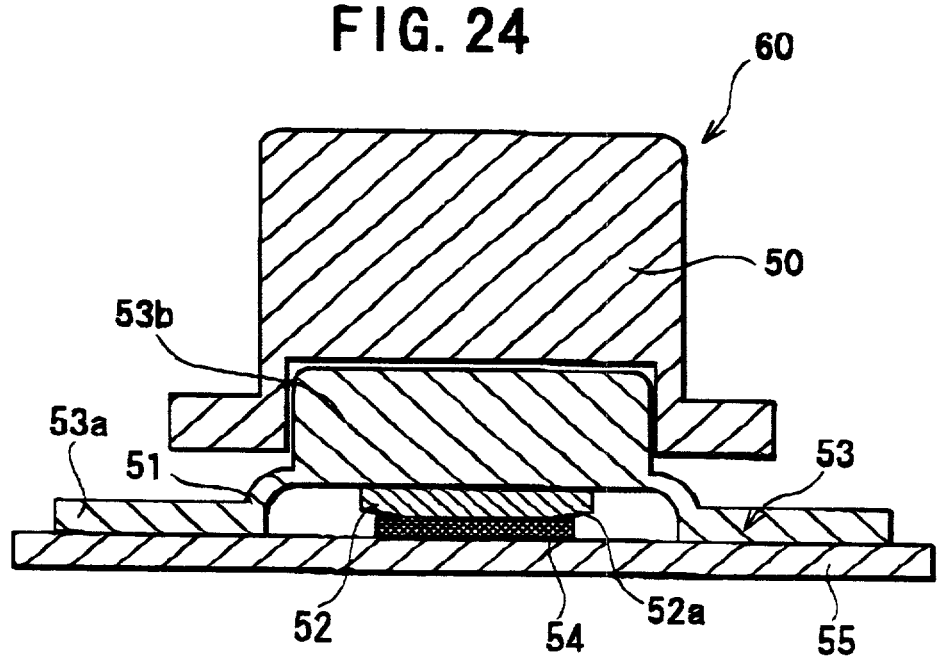
FIG. 24 is a cross-sectional view cut along a line in the pressure direction of a pressure-sensitive button in a partly pushed condition.
Figure 25:
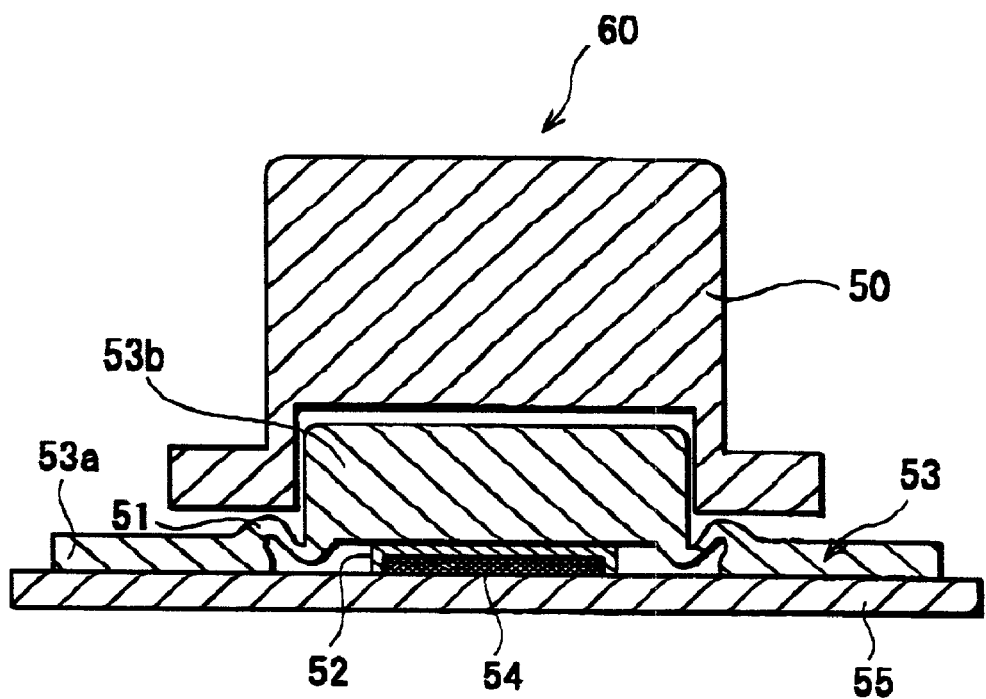
FIG. 25 is a cross-sectional view cut along a line in the pressure direction of a pressure-sensitive button in a fully pressed condition.

FIG. 23 through FIG. 25 show cross sections cut along a certain line running in the pushing pressure direction on pressure-sensitive button 60. It is noted that FIG. 23 shows pressure-sensitive button 60 in a non-pushed state; FIG. 24 shows pressure-sensitive button 60 in a partly pushed state; and FIG. 25 shows pressure-sensitive button 60 in a fully pushed state.

As shown in FIG. 23, pressure-sensitive button 60 has substrate 55; pad 53, which is comprises of flexible material such as rubber or a spring or the like; pressure member 52, which is comprised of flexible material such as rubber or a spring or the like; and switch cover 50, which is made of hard plastic such as ABS resin and the like or rubber or the like. Pressure-sensitive resistor 54, the resistance of which changes based on the contact area that makes contact with the object, is configured upon substrate 55. Pad 53 has rim 53a, which is fixated upon substrate 55; middle portion 53b, which is configured detached from substrate 55 so as to form a predetermines opening between pressure-sensitive resistor 54 and said middle portion; and wall 51, which integratively links rim 53a to middle portion 53b. Pressure member 52 is fixed on middle portion 53b within the opening, facing pressure sensitive resistor 54. Switch cover 50 is mounted upon middle portion 53b of pad 53, and is movable along with middle portion 53.

When the player depresses pad 53, wall 51 bends to transform in response to that pushing pressure; when the pushing pressure reaches a predetermined value or more, pressure-sensitive resistor 54 and pressure member 52 make contact as shown in FIG. 24 and FIG. 25.

Surface 52a of pressure Member 52 that faces pressure-sensitive resistor 54 has a rough conic shape with its central portion projecting out most. Since pressure member 52 is also formed of flexible material such as rubber and the like, in response to the pushing pressure applied by the operator (player), surface 52a of pressure member 52 transforms by touching and being crushed by pressure sensitive-resistor 54 at its central portion as shown in FIG. 24 and FIG. 25. It is noted that FIG. 24 and FIG. 25 respectively show the state where only the central portion (tip portion) of pressure member 52 touches pressure sensitive-resistor 54, and the state where the area of contact with pressure-sensitive resistor 54 and pressure member 52 is at the maximum the state where the entirety of side 52a touches pressure-sensitive resistor 54).

The resistance value of pressure-sensitive resistor 54 varies based on the area of contact with such pressure member 52 (in other words, in response to the pushing pressure); becomes a large resistance value when the contact area is small, and as the contact area expands, gradually changes to a small resistance value.

Figure 26:
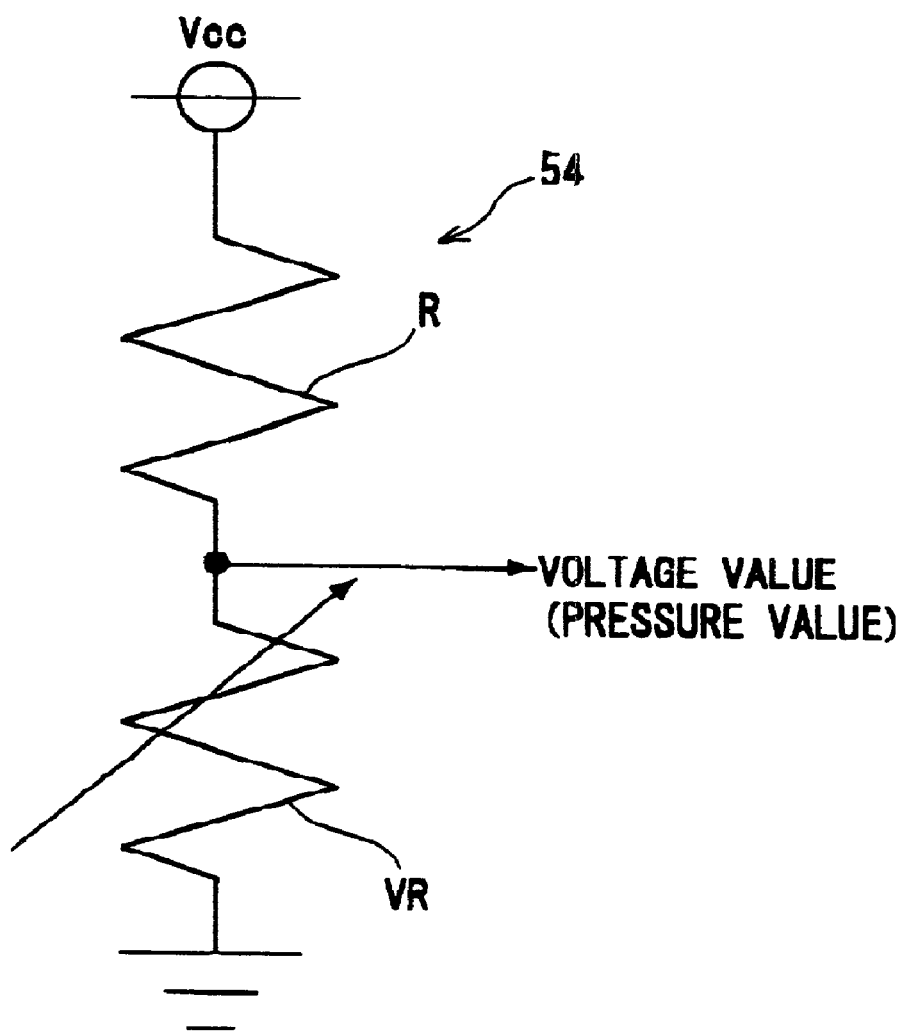
FIG. 26 is a circuit diagram showing the schematic structure of pressure-sensitive resistor with a resistance value that varies according to pushing pressure.

FIG. 26 shows the schematic circuitry of pressure-sensitive resistor 54, the resistance of which changes in response to the pushing pressure (the pushing pressure upon pressure-sensitive button 60).

As shown in FIG. 26, pressure-sensitive resistor 54 is inserted in series in the power supply line between the reference voltage (Vcc) and ground. Pressure-sensitive resistor 54 may be schematically illustrated by fixed resistor R and variable resistor VR.

Among these, the portion of the variable resistor VR corresponds to the contact portion of pressure member 52, wherewith its resistance value varies according to the contact area of pressure member 52. Namely, when pressure member 52 is in contact with pressure-sensitive resistor 54, since current flows with this pressure member 52 becoming a bridge, the resistance value of that contact portion (variable resistor VR) becomes smaller.

In this embodiment, the portion of the variable Resistor VR is connected to the ground side of the power supply line. Then, the analog signal in response to the pushing pressure upon button 60 is taken out from between the portion of fixed resistor R and the portion of variable resistor VR of pressure-sensitive resistor 54. As a result, the resistance value of variable resistor VR becomes smaller as the pushing pressure upon button 60 is weakened; concurrently, the voltage level of the analog signal taken out from between fixed resistor R and variable resistor VR increases.

Figure 27:
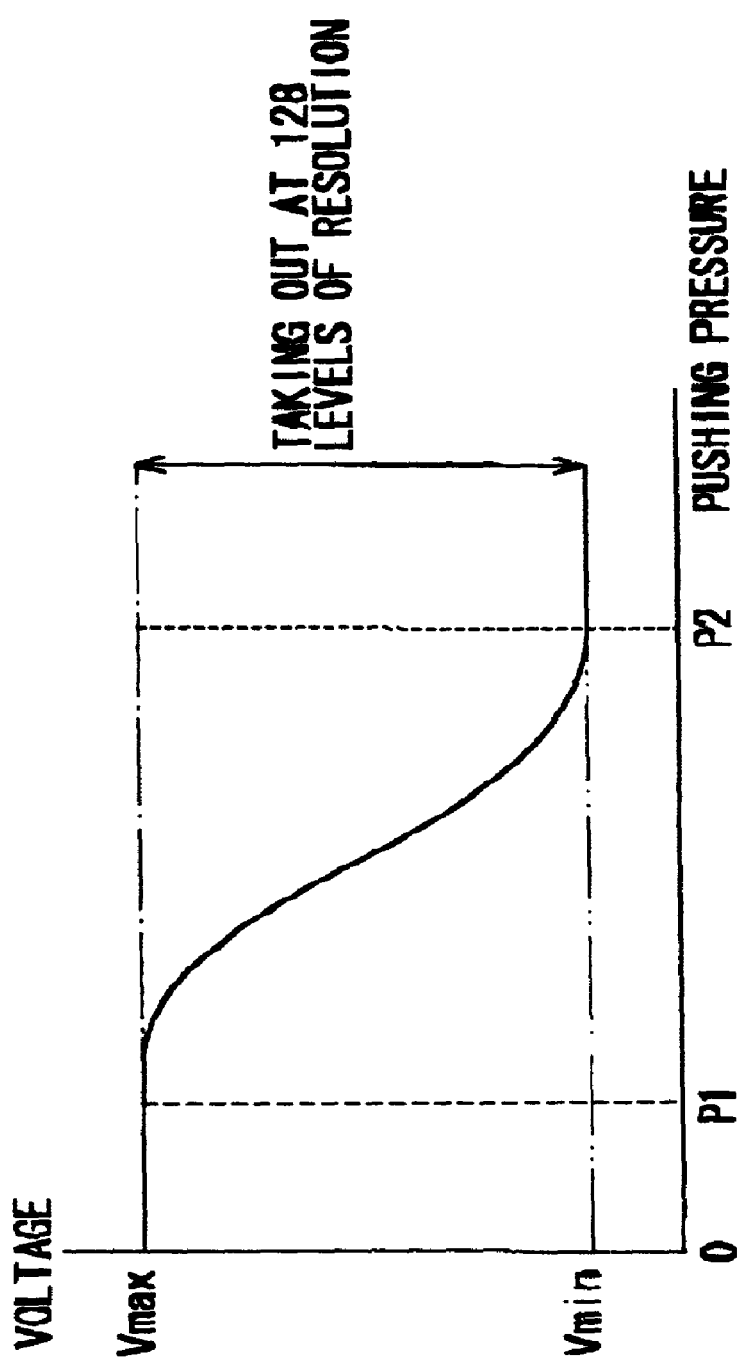
FIG. 27 is a diagram showing variation in pushing pressure (horizontal axis) applied to a pressure-sensitive button and voltage values (vertical axis) of electric signals corresponding to pushing pressure.

FIG. 27 is a graph showing variances in the pushing pressure (horizontal axis) that is applies to pressure-sensitive button 60 and the voltage values (vertical axis) of the electric signal corresponding to that pushing pressure. As can be understood from FIG. 27, in the state where pushing pressure is not applied to pressure-sensitive button 60 (pushing pressure is zero), since pressure member 52 is not in touch with pressure sensitive-resistor 54, the resistance value of pressure-sensitive resistor 54 is its maximum value. As a result, in this case, the maximum voltage (Vmax) is taken out from between fixed resistor R and variable resistor V as the analog signal that indicates the present pushing pressure.

When pushing pressure is applied to pressure-sensitive button 60 and that pushing pressure reaches pressure P1, pressure member 52 begins to touch pressure-sensitive resistor 54, whereby concurrently with the pushing pressure being increased from pressure P1, the resistance value of pressure-sensitive resistor 54 gradually diminishes. When the pushing pressure reaches pressure P2, the contact area of pressure-sensitive resistor 54 and pressure member 52 becomes its maximum size, whereby the resistance value of pressure-sensitive resistor 54 becomes its minimum value. At this time, the minimum voltage (Vmin) is taken out from between fixed resistor R and variable resistor VR as an analog signal that indicates the pushing pressure.

Figure 22:
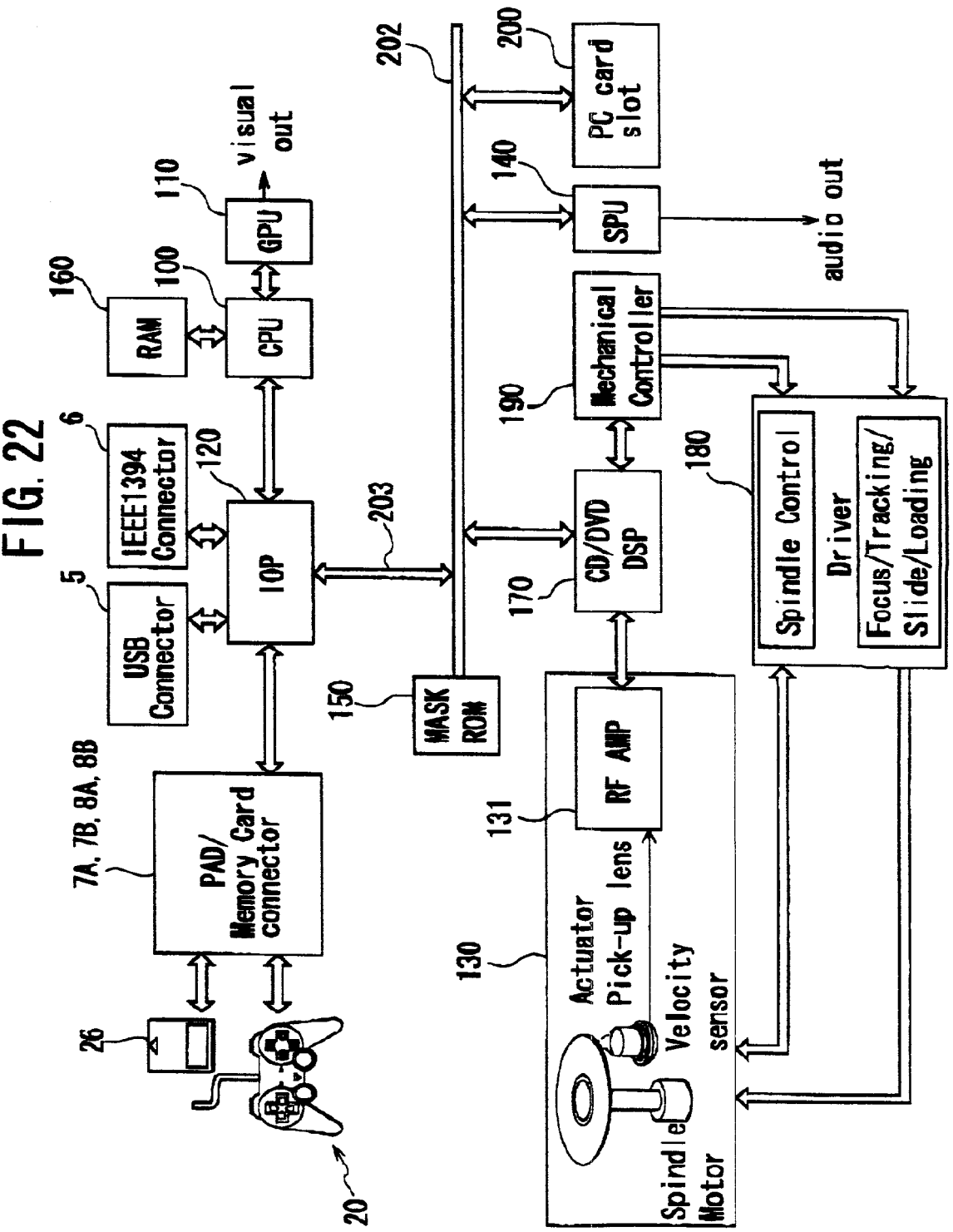
FIG. 22 is a block diagram showing the internal schematic structure of the TV game machine of this embodiment.

In this manner, the analog signal taken out from between fixed resistor R and variable resistor VR is transmitter to TV game machine 2 from controller 20 of FIG. 21 as the pressure-sensed value that indicates the pushing pressure at that time; moreover, it is transmitted to CPU 100 from I/O processor (IOP) 120 shown in FIG. 22 so as to carry out judgment and the like by CPU 100 in response to such aforementioned pressure-sensed values.

As described above, the game program of the sound game, by such as the distance among timing marks TM, number of marks, display color of each mark, the sign displayed upon the mark, and the moving of timing ball TB, visually informs the player of each element, such as tempo, rhythm, beat, volume, part designations and sostenuto, that are necessary for when carrying out simulated conducting and producing of music. Furthermore, the game program carries out adjustment of the duration for sostenuto by detecting the ON manipulation of the button upon the controller by the player, and detects the pushing pressure on that button so as to carry out volume adjustment according to that pressure-sensed value; moreover, by detecting manipulation or the direction keys upon the controller by the player, allowing the player to carry out simulated conducting and producing of music.

It is noted that the above description of the embodiment is an example of the present invention. As a result, the present invention is not limited to the embodiment described above, and needless to say, various modifications thereto according to design of choice and such can he made without deviating from the technical spirit and scope of the present invention.

Namely, the present invention is not one to be limited to sound games that are played in accordance with such musical performance as described above, but is also applicable to situations without music.

The present invention is also applicable to games that display timing marks in accordance with, for example, arrangements of dance steps so as to move a timing ball in accordance with actions to the steps.

Each of the elements needed when carrying out simulated conducting or producing or music is not limited to the six types of tempo, rhythm, beat, volume, part designations, and sostenuto.

The color and symbol and the like of each timing mark are not limited to the above example, wherewith by changing the display parameters for when displaying the timing marks upon the monitor screen, for example, the level of volume (weak/strong performance) may be expressed by the brightness of each timing mark instead of the color.

The timing marks and timing ball are not limited to the virtual objects displayed upon the television monitor screen, but the present invention may also be applicable to the structure such that a substantive object that corresponds to the timing ball moves among substantive objects that correspond to the timing marks, for example.

Figure 3:
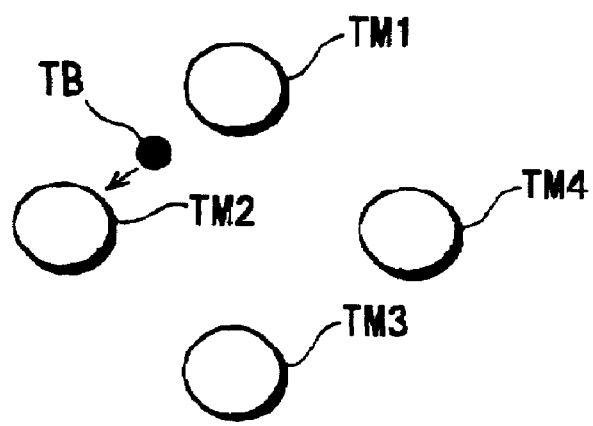
FIG. 3 is a schematic diagram for the description of the arrangement of timing marks in the case of quadruple time and a timing ball moving between each timing mark.

The shape formed by each timing mark is not limited to such equilateral triangle as in FIG. 1 and the like or square as in FIG. 3, but may be, for example, an isosceles triangle or trapezoid; the moving route of the timing ball may be not only a route of moving to each timing mark in turn, but may be a route where predetermined timing marks are skipped; and the moving speed of the timing ball is not limited to a fixed speed.

The set of timing marks and timing ball displayed upon the monitor screen may be not only one set but also may be a plurality of sets.

In addition, the part designations may be carried our by, for example, left analog operation part 31 other than the direction keys upon the controller.

While preferred embodiments of the present invention have been described using specific terms, such description is for illustrative purposes, and it is to be understood that changes and variations may be made without departing from the spirit or scope of the following claims.

As described above, the present invention expresses, by the number of predetermined objects, a structure that repeats periodically changing information (for example, beat of the music), and expresses the progressing speed of the information (for example, tempo of the music) by the moving of a moving object and the distance among the predetermined objects. As a result, the player may easily grasp the timing of the predetermined information and easily determine the cycle of the information. Namely, the player may, for example, easily grasp the temp of the music in the sound game, and furthermore may easily determine the beat of the piece. Accordingly, it becomes possible for the player to personally carry out a musical production, for example, as an orchestral conductor.

What is claimed is:

1. A computer-readable recording medium having recorded therein an information processing program, the program when executed by a processor performs:

a step of causing a computer to function as a musical piece management processor for reading information for generating musical tones and information as to at least a rhythm and a tempo that are set in relation to the information for generating musical tones, from a recording medium having recorded therein the information for generating musical tones and the information as to the at least a rhythm and tempo, and reproducing a musical piece while managing at least the rhythm and tempo; and a step of causing the computer to function as a mark/moving object display processor for, when the musical piece management processor reproduces the musical piece, arranging and displaying the same number of mark objects as beats corresponding to the information as to the rhythm of the musical piece reproduced and managed by the musical piece management processor, the mark objects each having a shape corresponding to the number of the beats and being related to a sequence of the beats, on a screen of a display, further displaying on the screen of the display a moving object so that the moving object travels between the mark objects on the screen periodically at a constant speed according to the sequence of the beats, and also controlling the display of the moving object and the mark objects by setting a special distance between the mark objects so that a cycle that the moving object travels over all the mark objects at the constant speed matches a measure of the tempo of the musical piece reproduced and managed by the musical piece management processor, the information processing program further comprising:

a step of causing the computer to function as an operation signal management processor for managing an operation signal output from an operational input device, the operation signal corresponding to an operational input made by a user;

a step of causing the computer to function as a determination processor for determining whether timing that the moving object moving on the screen overlaps with the mark object is coincident with timing that the operation signal is output from the operational input device to the operation signal management processor in response to an operation to the operational input device made by a user; and a step of causing the computer to function as a determination mark object display processor for displaying a determination mark object corresponding to a determination result of the determination processor as to whether a coincidence of the timing is obtained, on the mark object associated with the determination result, wherein the musical piece management processor manages strength information corresponding to the level of playing volume that is preset for a reproduced musical piece, and the information processing program further comprises:

a step of causing the computer to function as an operation signal management processor for managing an operation signal output from a strength input device, the operation signal corresponding to strength of an operational input made by a user;

a step of causing the computer to function as a determination processor for determining whether timing that the moving object moving on the screen overlaps with a mark object corresponding to a predetermined beat is coincident with timing that the operation signal is output from the strength input processor to the operation signal management processor when a user operates the strength input device, and further determining whether strength information of the operational input that is sensed by the operation signal management processor from the operation signal matches the strength information corresponding to the level of playing volume that is preset for the predetermined beat of the musical piece reproduced and managed by the musical piece management processor, when the moving object moving on the screen overlaps with the mark object corresponding to the predetermined beat; and a step of causing the computer to function as a notification processor for generating notification information corresponding to a determination result of the determination processor as to whether the two pieces of the strength information match each other when a coincidence of the timing is obtained, for one measure containing the predetermined beat of the musical piece that is reproduced and managed by the musical piece management processor, displaying the generated notification information on the screen of the display, and outputting sound of the generated notification information from a sound output device.

2. The computer-readable recording medium according to claim 1, the information processing program further comprising:

a step of causing the computer to function as parameter control processor for controlling modification of at least one of a parameter for setting the size of the mark object displayed on the screen by the mark/moving object display processor and a parameter for setting a display color or brightness of the mark object displayed on the screen by the mark/moving object display processor, depending on the level of playing volume that is preset for the predetermined beat of the musical piece reproduced and managed by the musical piece management processor; and a step of causing the computer to function as a mode switching processor for switching, according to a preset mode, between a mode in which the parameter control processor modifies the parameters and a mode in which the parameter control processor does not modify the parameters.

3. A computer-readable recording medium having recorded therein an information processing program, the program when executed by a processor performs:
- a step of causing a computer to function as a musical piece management processor for reading information for generating musical tones and information as to at least a rhythm and a tempo that are set in relation to the information for generating musical tones, from a recording medium having recorded therein the information for generating musical tones and the information as to the at least a rhythm and tempo, and reproducing a musical piece while managing at least the rhythm and tempo; and
- a step of causing the computer to function as a mark/moving object display processor for, when the musical piece management processor reproduces the musical piece, arranging and displaying the same number of mark objects as beats corresponding to the information as to the rhythm of the musical piece reproduced and managed by the musical piece management processor, the mark objects each having a shape corresponding to the number of the beats and being related to a sequence of the beats, on a screen of a display, further displaying on the screen of the display a moving object so that the moving object travels between the mark objects on the screen periodically at a constant speed according to the sequence of the beats, and also controlling the display of the moving object and the mark objects by setting a special distance between the mark objects so that a cycle that the moving object travels over all the mark objects at the constant speed matches a measure of the tempo of the musical piece reproduced and managed by the musical piece management processor, the information processing program further comprising:
- a step of causing the computer to function as an operation signal management processor for managing an operation signal output from an operational input device, the operation signal corresponding to an operational input made by a user;
- a step of causing the computer to function as a determination processor for determining whether timing that the moving object moving on the screen overlaps with the mark object is coincident with timing that the operation signal is output from the operational input device to the operation signal management processor in response to an operation to the operational input device made by a user; and
- a step of causing the computer to function as a determination mark object display processor for displaying a determination mark object corresponding to a determination result of the determination processor as to whether a coincidence of the timing is obtained, on the mark object associated with the determination result, wherein
the musical piece management processor manages direction information indicating a direction of playing instructions that is preset for a reproduced musical piece, and
the information processing program further comprises:
- a step of causing the computer to function as an operation signal management processor for managing an operation signal output from an operation direction input device, the operation signal corresponding to a direction of an operational input made by a user;
- a step of causing the computer to function as a determination processor for determining whether timing that the moving object moving on the screen overlaps with a mark object corresponding to a predetermined beat is coincident with timing that the operation signal is output from the operation direction input device to the operation signal management processor when a user operates the operation direction input device, and further determining whether direction information of the operational input sensed by the operation signal management processor from the operation signal matches the direction information of playing instructions that is preset for the predetermined beat of the musical piece reproduced and managed by the musical piece management processor, when the moving object moving on the screen overlaps with the mark object corresponding to the predetermined beat; and
- a step of causing the computer to function as a notification processor for generating notification information corresponding to a determination result of the determination processor as to whether the two pieces of the direction information match each other when a coincidence of the timing is obtained, for one measure containing the predetermined beat of the musical piece that is reproduced and managed by the musical piece management processor, displaying the generated notification information on the screen of the display device, and outputting sound of the generated notification information from a sound output device.

4. The computer-readable recording medium according to claim 3, the information processing program further comprising:
- a step of causing the computer to function as a symbol display processor for displaying a predetermined symbol indicating a predetermined directional instruction button provided on the operation direction input device on the mark object corresponding to the predetermined beat; and
- a step of causing the computer to function as mode switching processor for switching, according to a preset mode, between a mode in which the symbol display processor displays the predetermined symbol on the mark object corresponding to the predetermined beat and a mode in which the symbol display processor does not display the predetermined symbol on the mark object corresponding to the predetermined beat.

5. A computer-readable recording medium having recorded therein an information processing program, the program when executed by a processor performs:
- a step of causing a computer to function as a musical piece management processor for reading information for generating musical tones and information as to at least a rhythm and a tempo that are set in relation to the information for generating musical tones, from a recording medium having recorded therein the information for generating musical tones and the information as to the at least a rhythm and tempo, and reproducing a musical piece while managing at least the rhythm and tempo; and
- a step of causing the computer to function as a mark/moving object display processor for, when the musical piece management processor reproduces the musical piece, arranging and displaying the same number of mark objects as beats corresponding to the information as to the rhythm of the musical piece reproduced and managed by the musical piece management processor, the mark objects each having a shape corresponding to the number of the beats and being related to a sequence of the beats, on a screen of a display, further displaying on the screen of the display a moving object so that the moving object travels between the mark objects on the screen periodically at a constant speed according to the sequence of the beats, and also controlling the display of the moving object and the mark objects by setting a special distance between the mark objects so that a cycle that the moving object travels over all the mark objects at the constant speed matches a measure of the tempo of the musical piece reproduced and managed by the musical piece management processor, wherein the musical piece management processor manages time length information as to the length of time of continuance of playing sound or silent state that are preset for a reproduced musical sound, and the information processing program farther comprises:

a step of causing the computer to function as an operation signal management processor for managing an operation signal output from a pause input device, the operation signal corresponding to an operational input of a pause instruction made by a user;

a step of causing the computer to function as a determination processor for determining whether timing that the moving object moving on the screen overlaps with a mark object corresponding to a predetermined beat is coincident with timing that the operation signal is output from the pause input device to the operation signal management processor when a user starts to operate the pause input device, and further determining whether an operation for prolonging sound or silent state is successfully made according to whether the operational input continues a predetermined period of time, when the moving object moving on the screen overlaps with the mark object corresponding to the predetermined beat; and a step of causing the computer to function as a notification processor for generating notification information corresponding to a determination result of the determination processor as to whether the time length information matches when a coincidence of the timing is obtained, for one measure containing the predetermined beat of the musical piece that is reproduced and managed by the musical piece management processor, displaying the generated notification information on the screen of the display device, and outputting sound of the generated notification information from a sound output device.

6. An information processing apparatus comprising:

a musical piece management processor for reading information for generating musical tones and information as to at least a rhythm and a tempo that are set in relation to the information for generating musical tones, from a recording medium having recorded therein the information for generating musical tones and the information as to the at least a rhythm and tempo, and reproducing a musical piece while managing at least the rhythm and tempo; and a mark/moving object display processor for, when the musical piece management processor reproduces the musical piece, arranging and displaying the same number of mark objects as beats corresponding to the information as to the rhythm of the musical piece reproduced and managed by the musical piece management processor, the mark objects each having a shape corresponding to the number of the beats and being related to a sequence of the beats, on a screen of a display device, further displaying on the screen of the display device a moving object so that the moving object travels between the mark objects on the screen periodically at a constant speed according to the sequence of the beats, and also controlling the display of the moving object and the mark objects by setting a special distance between the mark objects so that a cycle that the moving object travels over all the mark objects at the constant speed matches a measure of the tempo of the musical piece reproduced and managed by the musical piece management processor, wherein the musical piece management processor manages strength information corresponding to the level of playing volume that is preset for a reproduced musical piece, and the apparatus farther comprises:

an operation signal management processor for managing an operation signal output from a strength input device, the operation signal corresponding to strength of an operational input made by a user;

a determination processor for determining whether timing that the moving object moving on the screen overlaps with a mark object corresponding to a predetermined beat is coincident with timing that the operation signal is output from the strength input device to the operation signal management processor when a user operates the strength input device, and further determining whether strength information of the operational input that is sensed by the operation signal management processor from the operation signal matches the strength information corresponding to the level of playing volume that is preset for the predetermined beat of the musical piece reproduced and managed by the musical piece management processor, when the moving object moving on the screen overlaps with the mark object corresponding to the predetermined beat; and a notification processor for generating notification information corresponding to a determination result of the determination processor as to whether the two pieces of the strength information match each other when a coincidence of the timing is obtained, for one measure containing the predetermined beat of the musical piece that is reproduced and managed by the musical piece management processor, displaying the generated notification information on the screen of the display device, and outputting sound of the generated notification information from a sound output device.

7. The information processing apparatus according to claim 6, further comprising:

a parameter control processor for controlling modification of at least one of a parameter for setting the size of the mark object displayed on the screen by the mark/moving object display processor and a parameter for setting a display color or brightness of the mark object displayed on the screen by the mark/moving object display processor, depending on the level of playing volume that is preset for the predetermined beat of the musical piece reproduced and managed by the musical piece management processor; and a mode switching processor for switching, according to a preset mode, between a mode in which the parameter control processor modifies the parameters and a mode in which the parameter control processor does not modify the parameters.

8. An information processing apparatus comprising:

a musical piece management processor for reading information for generating musical tones and information as to at least a rhythm and a tempo that are set in relation to the information for generating musical tones, from a recording medium having recorded therein the information for generating musical tones and the information as to the at least a rhythm and tempo, and reproducing a musical piece while managing at least the rhythm and tempo; and a mark/moving object display processor for, when the musical piece management processor reproduces the musical piece, arranging and displaying the same number of mark objects as beats corresponding to the information as to the rhythm of the musical piece reproduced and managed by the musical piece management processor, the mark objects each having a shape corresponding to the number of the beats and being related to a sequence of the beats, on a screen of a display device, further displaying on the screen of the display device a moving object so that the moving object travels between the mark objects on the screen periodically at a constant speed according to the sequence of the beats, and also controlling the display of the moving object and the mark objects by setting a special distance between the mark objects so that a cycle that the moving object travels over all the mark objects at the constant speed matches a measure of the tempo of the musical piece reproduced and managed by the musical piece management processor, wherein the musical piece management processor manages direction information indicating a direction of playing instructions that is preset for a reproduced musical piece, and the apparatus farther comprises:

an operation signal management processor for managing an operation signal output from an operation direction input device, the operation signal corresponding to a direction of an operational input made by a user;

a determination processor for determining whether timing that the moving object moving on the screen overlaps with a mark object corresponding to a predetermined beat is coincident with timing that the operation signal is output from the operation direction input device to the operation signal management processor when a user operates the operation direction input device, and further determining whether direction information of the operational input sensed by the operation signal management processor from the operation signal matches the direction information of playing instructions that is preset for the predetermined beat of the musical piece reproduced and managed by the musical piece management processor, when the moving object moving on the screen overlaps with the mark object corresponding to the predetermined beat; and a notification processor for generating notification information corresponding to a determination result of the determination processor as to whether the two pieces of the direction information match each other when a coincidence of the timing is obtained, for one measure containing the predetermined beat of the musical piece that is reproduced and managed by the musical piece management processor, displaying the generated notification information on the screen of the display device, and outputting sound of the generated notification information from a sound output device.

9. The information processing apparatus according to claim 8, further comprising:

a symbol display processor for displaying a predetermined symbol indicating a predetermined directional instruction button provided on the operation direction input device on the mark object corresponding to the predetermined beat; and a mode switching processor for switching, according to a preset mode, between a mode in which the symbol display processor displays the predetermined symbol on the mark object corresponding to the predetermined beat and a mode in which the symbol display processor does not display the predetermined symbol on the mark object corresponding to the predetermined beat.

10. An information processing apparatus comprising:

a musical piece management processor for reading information for generating musical tones and information as to at least a rhythm and a tempo that are set in relation to the information for generating musical tones, from a recording medium having recorded therein the information for generating musical tones and the information as to the at least a rhythm and tempo, and reproducing a musical piece while managing at least the rhythm and tempo; and a mark/moving object display processor for, when the musical piece management processor reproduces the musical piece, arranging and displaying the same number of mark objects as beats corresponding to the information as to the rhythm of the musical piece reproduced and managed by the musical piece management processor, the mark objects each having a shape corresponding to the number of the beats and being related to a sequence of the beats, on a screen of a display device, further displaying on the screen of the display device a moving object so that the moving object travels between the mark objects on the screen periodically at a constant speed according to the sequence of the beats, and also controlling the display of the moving object and the mark objects by setting a special distance between the mark objects so that a cycle that the moving object travels over all the mark objects at the constant speed matches a measure of the tempo of the musical piece reproduced and managed by the musical piece management processor, wherein the musical piece management processor manages time length information as to the length of time during which playing sound or silent state that is preset for a reproduced musical piece continues, and the apparatus farther comprises:

an operation signal management processor for managing an operation signal output from a pause input device, the operation signal corresponding to an operational input of a pause instruction made by a user;

a determination processor for determining whether timing that the moving object moving on the screen overlaps with a mark object corresponding to a predetermined beat is coincident with timing that the operation signal is output from the pause input device to the operation signal management processor when a user staffs to operate the pause input device, and further determining whether an operation for prolonging sound or silent state is successfully made according to whether the operational input continues a predetermined period of time, when the moving object moving on the screen overlaps with the mark object corresponding to the predetermined beat; and a notification processor for generating notification information corresponding to a determination result of the determination processor as to whether the time length information matches when a coincidence of the timing is obtained, for one measure containing the predetermined beat of the musical piece that is reproduced and managed by the musical piece management processor, displaying the generated notification information on the screen of the display device, and outputting sound of the generated notification information from a sound output device.

11. The information processing apparatus according to claim 10, further comprising:
a symbol display processing means processor for displaying a predetermined symbol indicating a predetermined button that is operable as the pause input device, on the mark object corresponding to the predetermined beat; and a mode switching processor for switching, according to a preset mode, between a mode in which the symbol display processor displays the predetermined symbol on the mark object corresponding to the predetermined beat and a mode in which the symbol display processor does not display the predetermined symbol on the mark object corresponding to the predetermined beat.

* * * * *